United States Patent
Iwase et al.

(10) Patent No.: US 10,017,627 B1
(45) Date of Patent: Jul. 10, 2018

(54) METHACRYLIC RESIN COMPOSITION

(71) Applicant: ASAHI KASEI KABUSHIKI KAISHA, Chiyoda-ku, Tokyo (JP)

(72) Inventors: Katsuhiro Iwase, Tokyo (JP); Keigo Sasaki, Tokyo (JP); Harumi Watanabe, Tokyo (JP); Toshiharu Seyama, Tokyo (JP); Fumiki Murakami, Tokyo (JP); Miyuki Kazunori, Tokyo (JP)

(73) Assignee: ASAHI KASEI KABUSHIKI KAISHA, Chiyoda-ku, Tokyo (JP)

( * ) Notice: Subject to any disclaimer, the term of this patent is extended or adjusted under 35 U.S.C. 154(b) by 0 days.

(21) Appl. No.: 15/912,902

(22) Filed: Mar. 6, 2018

(51) Int. Cl.
*C08K 5/49* (2006.01)
*C08L 3/10* (2006.01)
*C08K 5/527* (2006.01)
*C08K 5/524* (2006.01)
*C08K 5/521* (2006.01)

(52) U.S. Cl.
CPC .............. *C08K 5/527* (2013.01); *C08K 5/521* (2013.01); *C08K 5/524* (2013.01)

(58) Field of Classification Search
None
See application file for complete search history.

(56) References Cited

U.S. PATENT DOCUMENTS

| | | | | |
|---|---|---|---|---|
| 4,840,830 A * | 6/1989 | Sakamoto | ................. | C08J 5/18 428/141 |
| 2007/0208119 A1 * | 9/2007 | Ueda | .................... | C08K 5/0008 524/284 |
| 2013/0072651 A1 | 3/2013 | Yonemura et al. | | |
| 2015/0299360 A1 * | 10/2015 | Murakami | ............ | C08F 220/18 428/220 |

FOREIGN PATENT DOCUMENTS

| | | |
|---|---|---|
| JP | H06116331 A | 4/1994 |
| JP | H08217944 A | 8/1996 |
| JP | H1045850 A | 2/1998 |
| JP | 2001151814 A | 6/2001 |
| JP | 2005154763 A * | 6/2005 |
| JP | 2007261265 | 10/2007 |
| JP | 2007262396 | 10/2007 |
| JP | 2008076764 A | 4/2008 |
| JP | 2009294359 A | 12/2009 |
| JP | 2013083907 A | 5/2013 |
| JP | 2013083956 A | 5/2013 |
| JP | 2014028956 A | 2/2014 |
| JP | 2014181256 A * | 9/2014 |
| JP | 2015067771 A | 4/2015 |
| JP | 2015135355 A | 7/2015 |
| JP | 2015183023 A * | 10/2015 |
| JP | 2017132981 A | 8/2017 |

OTHER PUBLICATIONS

Jan. 17, 2017, Notification of Reasons for Refusal issued by the Japan Patent Office in the corresponding Japanese Patent Application No. 2016-209971.
Toshiya Takahashi et al., New Development of Polymer Additives, R&D Report "Sumitomo Kagaku", Nov. 30, 2009, pp. 19-27, vol. 2009, Issue 2.
Written Opposition dated Nov. 2, 2017 against Japanese Patent Registration No. 6114454 (Opposition No. 2017-700980) issued by the Japan Patent Office with a partial English translation.

* cited by examiner

*Primary Examiner* — Vu A Nguyen
(74) *Attorney, Agent, or Firm* — Kenja IP Law PC

(57) ABSTRACT

A methacrylic resin composition having high heat resistance, excellent birefringence, and excellent heat stability and molding processability is provided. A methacrylic resin composition comprises: a methacrylic resin including a structural unit (X) having a cyclic structure-containing main chain, the structural unit (X) being at least one type selected from the group consisting of an N-substituted maleimide monomer-derived structural unit, a glutarimide-based structural unit, and a lactone ring structural unit; and an organic phosphorous compound, wherein a glass transition temperature is more than 120° C. and 160° C. or less, a content of a phosphorus element is 10 mass ppm to 1000 mass ppm, and a ratio P3/P5 of an integral value P3 of a spectral peak assigned to trivalent phosphorus to an integral value P5 of a spectral peak assigned to pentavalent phosphorus in $^{31}$P-NMR measurement is 0.2 to 5.0.

15 Claims, No Drawings

METHACRYLIC RESIN COMPOSITION

TECHNICAL FIELD

This disclosure relates to a methacrylic resin composition having high heat resistance, highly controlled birefringence, and excellent heat stability and molding processability.

BACKGROUND

Methacrylic resins have excellent transparency, surface hardness, and so forth, and only display a small degree of the optical property of birefringence. For these reasons, methacrylic resin has been receiving attention as optical resin for optical material in various optical products such as flat panel displays, e.g. liquid crystal displays, plasma displays, and organic EL displays, small infrared sensors, fine optical waveguides, micro lenses, and DVD/Blu-ray Disc pickup lenses handling short-wavelength light, optical discs, optical films, and plastic substrates. The market for methacrylic resin is therefore expanding.

Particularly, methacrylic resin having a cyclic structure-containing main chain and compositions containing such methacrylic resin are known to have excellent performance in both heat resistance and optical property, and the demand for them has been rapidly growing year by year. However, in the case where methacrylic resin having a cyclic structure-containing main chain and exhibiting improved heat resistance and optical property is heat-molten to be processed into a film or other molded product to obtain a member for optical use, there is the drawback that, due to its high glass transition temperature, melt processing at a relatively high temperature needs to be performed, which tends to induce thermal decomposition. Besides, with the growing demand and the increasing requirement for higher quality in recent years, melt molding using a large extruder that has a higher discharge rate, includes various filters for foreign matter removal, generates heat easily, and has a relatively long residence time has been increasingly employed. This has raised expectations for the provision of methacrylic resin having excellent molding stability even under such harsh molding conditions and having excellent optical property and heat resistance enabling the provision of higher-quality members for optical use, and compositions containing such methacrylic resin.

Many compositions obtained by adding at least one antioxidant selected from antioxidants such as specific phenol-based antioxidant, phosphorus-based antioxidant, and sulfur-based antioxidant to methacrylic resin for the purposes of improving the heat stability of the methacrylic resin and suppressing color change due to heat melting, and molded products and films using such compositions have conventionally been known.

Moreover, regarding methacrylic resin having a ring structure in a main chain and having a high glass transition temperature and compositions containing such methacrylic resin, the following attempts have been made, in addition to the above-mentioned purposes: adding an organic phosphorous compound including a phosphorus-based antioxidant as a stabilizer for coloring inhibition of a polymerization product, and for cyclization catalysis and/or intermolecular crosslinking inhibition when using a production method of introducing a ring structure into a main chain by cyclization reaction; and adding the antioxidant in any of the steps for manufacturing the resin composition to improve heat stability.

For example, JP H6-116331 A (PTL 1) proposes a composition containing 10 wt % or more of a maleimide-based monomer and also containing, with respect to the whole monomers, 0.001 wt % to 1 wt % of a compound having a phosphorus atom. According to PTL 1, such a composition can exhibit high transparency without yellowing even when exposed to high temperature for a long time.

JP H8-217944 A (PTL 2) proposes a resin composition containing a hindered amine-based light stabilizer, a hindered phenol-based antioxidant, and a phosphite-based antioxidant in a copolymer containing 10 wt % to 70 wt % of methyl methacrylate, 5 wt % to 30 wt % of N-substituted maleimide, 15 wt % to 85 wt % of cyclohexyl methacrylate, and 0 wt % to 30 wt % of other copolymerizable monomer. PTL 2 proposes obtaining a molded product having little foreign matter contamination due to continuous long-time molding and little coloring during molding and little coloring in a high-temperature atmosphere (around 100° C.), and excellent heat resistance and low birefringence.

JP H10-45850 A (PTL 3) proposes a method of efficiently manufacturing resin with little coloring by employing a polymerization method whereby, when polymerizing a radical-polymerizable monomer containing N-substituted maleimide, at least one antioxidant selected from the group consisting of a phenol-based antioxidant and a phosphorus-based antioxidant is used in such a manner that part of the antioxidant is caused to coexist in the polymerization of the monomer component and the rest of the antioxidant is added after the polymerization of the monomer component ends.

JP 2008-76764 A (PTL 4) proposes a composition for molding containing: a resin component including, as a main component, methacrylic resin having a lactone ring structure; and an antioxidant selected from a phenol-based antioxidant, a thioether-based antioxidant, and a phosphorus-based antioxidant that is 0.02 parts by weight or more with respect to 100 parts by weight of the resin component and whose weight decrease in heating at 300° C. for 20 min is 10% or less. According to PTL 4, such a composition has excellent heat resistance and excellent optical transparency, and can suppress foaming in an optical film even when the molding temperature is 250° C. or more.

JP 2013-83907 A (PTL 5) proposes a method of including an antioxidant such as a phosphorus-based antioxidant in a resin composition containing: methacrylic resin having a cyclic structure-containing main chain; and elastic organic fine particles having a conjugated diene monomer structural unit as an essential component, thus improving the stability of the optical property of a retardation film obtained by molding. According to PTL 5, the antioxidant may be mixed together when mixing the methacrylic resin and the elastic organic fine particles, e.g. by kneading using a twin screw extruder, or, when preparing the methacrylic resin or the elastic organic fine particles, mixed together with the corresponding structural monomer component.

CITATION LIST

Patent Literatures

PTL 1: JP H6-116331 A
PTL 2: JP H8-217944 A
PTL 3: JP H10-45850 A
PTL 4: JP 2008-76764 A
PTL 5: JP 2013-83907 A

SUMMARY

In recent years, for its growing demand as an optical film, methacrylic resin having a cyclic structure-containing main chain has been increasingly used in melt processing by a large extruder provided with various filters for foreign matter removal and having a relatively long residence time, where the tendency of performing melt processing at a higher discharge rate and a higher temperature has been increasing. In such a case, many instances of troubles during film production, such as more clogging of the filters provided in the extruder and more stain of casting rolls during film molding, and product quality degradation, such as an increase of foreign matter in a film for optical use and formation of stripe-like objects or silver streaks on its surface, tend to occur.

There is thus a strong demand for a methacrylic resin composition that enables stable melt molding and ensures high molded product quality with little aggregated foreign matter formation in molten resin and little side reaction such as crosslinking even in melt processing under such harsh conditions.

However, none of the proposals in the prior art documents concerns whether or not the corresponding composition enables stable melt extrusion and molding to obtain a molded product having excellent performance even in the case where the melt processing conditions are harsher, e.g. a large extruder or molding machine is used, or an extruder provided with high-precision filters for foreign matter removal and having a longer residence time is used. Besides, although many attempts for improvement by a composition blended with each type of antioxidant have been made and the corresponding preferable compounding amount has been noted, there is no mention of a requirement for each type of antioxidant in the obtained composition, in particular a phosphorus-based antioxidant, to more effectively function in the above-mentioned harsher use conditions.

Typically, an organic phosphorous compound such as a phosphorus-based antioxidant used in a resin composition is an organic phosphorous compound (hereafter also referred to as "phosphites") having a trivalent phosphorus element, and is known to be easily oxidized when heated in the presence of oxygen and also be susceptible to hydrolysis. It is also known that an organic phosphorous compound having a trivalent phosphorus element generates, by hydrolysis, acid P—OH and PH=O proton, directly reacts with oxygen or hydroperoxide, and becomes an organic phosphorous compound having a pentavalent phosphorus element.

An organic phosphorous compound having a pentavalent phosphorus element typically has relatively high chemical stability, and is known to be blended with, for example, thermoplastic resin as a non-halogen-based flame retardant or a plasticizer. However, in the case of being contained in methacrylic resin having a relatively high glass transition temperature, the organic phosphorous compound is likely to cause problems in melt processing such as extrusion or molding, for example by facilitating the formation of gel-like material or foreign matter by aggregation in a molten state at high temperature or, when coming into contact with metal material including iron, strongly adsorbing to its surface.

It could therefore be helpful to provide a composition that can stably provide a member suitable for higher quality optical use by melt processing or the like and exhibit more stable and excellent performance during a raw material use period, using a methacrylic resin composition obtained by blending an organic phosphorous compound with methacrylic resin having a relatively high glass transition temperature.

As a result of repeatedly conducting extensive research, we discovered that the above-mentioned problem can be solved by, in a composition containing at least: methacrylic resin having a relatively high glass transition temperature and having a cyclic structure-containing main chain; and an organic phosphorous compound, appropriately setting the content and valence of a phosphorus element included in the composition.

The primary features of this disclosure are as follows.

[1] A methacrylic resin composition comprising:
a methacrylic resin including a structural unit (X) having a cyclic structure-containing main chain, the structural unit (X) being at least one type selected from the group consisting of an N-substituted maleimide monomer-derived structural unit, a glutarimide-based structural unit, and a lactone ring structural unit; and
an organic phosphorous compound, wherein
a glass transition temperature is more than 120° C. and 160° C. or less,
a phosphorus element has a content of 10 mass ppm to 1000 mass ppm, and
a ratio P3/P5 of an integral value P3 of a spectral peak assigned to trivalent phosphorus to an integral value P5 of a spectral peak assigned to pentavalent phosphorus in $^{31}$P-NMR measurement is 0.2 to 5.0.

[2] The methacrylic resin composition according to the foregoing [1], having a residual solvent amount of less than 1000 mass ppm.

[3] The methacrylic resin composition according to the foregoing [1] or [2], having a residual alcohol amount of less than 500 mass ppm.

[4] The methacrylic resin composition according to any one of the foregoing [1] to [3], having a weight-average molecular weight Mw of 90,000 to 200,000 as measured by gel permeation chromatography (GPC) as a polymethyl methacrylate equivalent value.

[5] The methacrylic resin composition according to any one of the foregoing [1] to [4], wherein
the structural unit (X) includes the glutarimide-based structural unit, and
the glutarimide-based structural unit has a content of 5 mass % to 70 mass % with respect to 100 mass % of the methacrylic resin.

[6] The methacrylic resin composition according to any one of the foregoing [1] to [4], wherein
the structural unit (X) includes an N-substituted maleimide monomer-derived structural unit, and
the N-substituted maleimide monomer-derived structural unit has a content of 5 mass % to 40 mass % relative to 100 mass % of the methacrylic resin.

[7] The methacrylic resin composition according to any one of the foregoing [1] to [4], wherein
the structural unit (X) includes a lactone ring structural unit, and
the lactone ring structural unit has a content of 5 mass % to 40 mass % relative to 100 mass % of the methacrylic resin.

[8] The methacrylic resin composition according to any one of the foregoing [1] to [7], having a photoelastic coefficient with an absolute value of $3.0 \times 10^{-12}$ $Pa^{-1}$ or less.

[9] The methacrylic resin composition according to the foregoing [8], having a photoelastic coefficient with an absolute value of $1.0 \times 10^{-12}$ $Pa^{-1}$ or less.

According to this disclosure, it is thus possible to provide a methacrylic resin composition having high heat resistance, excellent birefringence, and excellent heat stability and molding processability.

DETAILED DESCRIPTION

The following provides a detailed description of an embodiment of the present disclosure (hereinafter, also referred to as the "present embodiment"). However, the present disclosure is not limited by the following description and may be implemented with various modifications within the essential scope thereof.

(Methacrylic Resin Composition)

A methacrylic resin composition according to the present embodiment contains a methacrylic resin and an organic phosphorous compound, and may contain other thermoplastic resins and additives as necessary.

—Methacrylic Resin—

The methacrylic resin according to the present embodiment includes a structural unit (X) having a cyclic structure-containing main chain and a methacrylic acid ester monomer-derived structural unit. The structural unit (X) is at least one selected from the group consisting of an N-substituted maleimide monomer-derived structural unit, a glutarimide-based structural unit, and a lactone ring structural unit.

Each monomer structural unit is described below.

—Methacrylic Acid Ester Monomer-Derived Structural Unit—

First, the methacrylic acid ester monomer-derived structural unit is described.

The methacrylic acid ester monomer-derived structural unit is, for example, formed from a monomer selected from the following methacrylic acid esters.

Examples of methacrylic acid esters that can be used include methyl methacrylate, ethyl methacrylate, n-propyl methacrylate, isopropyl methacrylate, n-butyl methacrylate, isobutyl methacrylate, t-butyl methacrylate, 2-ethylhexyl methacrylate, cyclopentyl methacrylate, cyclohexyl methacrylate, cyclooctyl methacrylate, tricyclodecyl methacrylate, dicyclooctyl methacrylate, tricyclododecyl methacrylate, isobornyl methacrylate, phenyl methacrylate, benzyl methacrylate, 1-phenylethyl methacrylate, 2-phenoxyethyl methacrylate, 3-phenylpropyl methacrylate, and 2,4,6-tribromophenyl methacrylate.

One of these monomers may be used individually, or two or more of these monomers may be used together.

Of these methacrylic acid esters, methyl methacrylate and benzyl methacrylate are preferable in terms of providing the resultant methacrylic resin with excellent transparency and weather resistance.

The methacrylic resin may include just one type of methacrylic acid ester monomer-derived structural unit or may include two or more types of methacrylic acid ester monomer-derived structural units.

The following particularly describes the structural unit (X) in the methacrylic resin including the structural unit (X) having the cyclic structure-containing main chain.

—N-Substituted Maleimide Monomer-Derived Structural Unit—

Next, an N-substituted maleimide monomer-derived structural unit is described.

The N-substituted maleimide monomer-derived structural unit may be formed from at least one selected from a monomer represented by the following formula (1) and/or a monomer represented by the following formula (2), and is preferably formed from both a monomer represented by the following formula (1) and a monomer represented by the following formula (2).

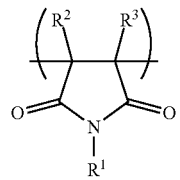

(1)

In formula (1), $R^1$ represents an arylalkyl group having a carbon number of 7 to 14 or an aryl group having a carbon number of 6 to 14, and $R^2$ and $R^3$ each represent, independently of one another, a hydrogen atom, an alkyl group having a carbon number of 1 to 12, or an aryl group having a carbon number of 6 to 14.

Note that in a situation in which $R^2$ is an aryl group, $R^2$ may include a halogen as a substituent.

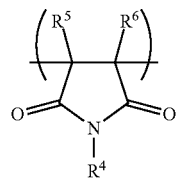

(2)

In formula (2), $R^4$ represents a hydrogen atom, a cycloalkyl group having a carbon number of 3 to 12, or an alkyl group having a carbon number of 1 to 12, and $R^5$ and $R^6$ each represent, independently of one another, a hydrogen atom, an alkyl group having a carbon number of 1 to 12, or an aryl group having a carbon number of 6 to 14.

Specific examples are listed below.

Examples of monomers represented by formula (1) include N-phenylmaleimide, N-benzylmaleimide, N-(2-chlorophenyl)maleimide, N-(4-chlorophenyl)maleimide, N-(4-bromophenyl)maleimide, N-(2-methylphenyl)maleimide, N-(2-ethylphenyl)maleimide, N-(2-methoxyphenyl)maleimide, N-(2-nitrophenyl)maleimide, N-(2,4,6-trimethylphenyl)maleimide, N-(4-benzylphenyl)maleimide, N-(2,4,6-tribromophenyl)maleimide, N-naphthylmaleimide, N-anthracenylmaleimide, 3-methyl-1-phenyl-1H-pyrrole-2,5-dione, 3,4-dimethyl-1-phenyl-1H-pyrrole-2,5-dione, 1,3-diphenyl-1H-pyrrole-2,5-dione, and 1,3,4-triphenyl-1H-pyrrole-2,5-dione.

Of these monomers, N-phenylmaleimide and N-benzylmaleimide are preferable in terms of providing the resultant methacrylic resin with excellent heat resistance and optical properties such as birefringence.

One of these monomers may be used individually, or two or more of these monomers may be used together.

Examples of monomers represented by formula (2) include N-methylmaleimide, N-ethylmaleimide, N-n-propylmaleimide, N-isopropylmaleimide, N-n-butylmaleimide, N-isobutylmaleimide, N-s-butylmaleimide, N-t-butylmaleimide, N-n-pentylmaleimide, N-n-hexylmaleimide, N-n-heptylmaleimide, N-n-octylmaleimide, N-laurylmaleimide, N-stearylmaleimide, N-cyclopentylmaleimide, N-cyclohexylmaleimide, 1-cyclohexyl-3-methyl-1-phenyl-1H-pyrrole-2,5-dione, 1-cyclohexyl-3,4-dimethyl-1-phenyl-1H-pyrrole-2,5-dione, 1-cyclohexyl-3-methyl-1H-pyrrole-2,5-dione, 1-cyclohexyl-3,4-dimethyl-1H-pyrrole-2,5-dione, 1-cyclohexyl-3-phenyl-1H-pyrrole-2,5-dione, and 1-cyclohexyl-3,4-diphenyl-1H-pyrrole-2,5-dione.

Of these monomers, N-methylmaleimide, N-ethylmaleimide, N-isopropylmaleimide, and N-cyclohexylmaleimide are preferable in terms of providing the resultant methacrylic resin with excellent weather resistance, and N-cyclohexylmaleimide is particularly preferable in terms of providing excellent low water absorbency demanded of optical materials in recent years.

One of these monomers may be used individually, or two or more of these monomers may be used together.

The methacrylic resin according to the present embodiment is particularly preferably obtained using a monomer represented by formula (1) and a monomer represented by formula (2), in combination, in order to exhibit a high level of control on birefringence properties.

The content (B1) of a structural unit derived from the monomer represented by formula (1), in terms of a molar ratio (B1/B2) relative to the content (B2) of a structural unit derived from the monomer represented by formula (2), is preferably greater than 0 and no greater than 15, and more preferably greater than 0 and no greater than 10.

When the molar ratio B1/B2 is within any of the ranges set forth above, the methacrylic resin according to the present embodiment can display good heat resistance and good photoelastic properties while maintaining transparency, and without yellowing or loss of environmental resistance.

The content of the N-substituted maleimide monomer-derived structural unit is not specifically limited so long as the resultant composition satisfies the glass transition temperature ranges according to the present embodiment. However, the content of the N-substituted maleimide monomer-derived structural unit relative to 100 mass % of the methacrylic resin is preferably 5 mass % to 40 mass %, and more preferably 5 mass % to 35 mass %.

When the content of the N-substituted maleimide monomer-derived structural unit is within any of the ranges set forth above, a more adequate enhancement effect can be achieved with respect to heat resistance of the methacrylic resin, and a more preferable enhancement effect can also be achieved with respect to weather resistance, low water absorbency, and optical properties of the methacrylic resin. Restricting the content of the N-substituted maleimide monomer-derived structural unit to 40 mass % or less is effective for preventing a decrease in physical properties of the methacrylic resin caused by a large amount of monomer remaining unreacted due to reduced reactivity of monomer components in the polymerization reaction.

The methacrylic resin according to the present embodiment that includes the N-substituted maleimide monomer-derived structural unit may further include structural units derived from other monomers that are copolymerizable with the methacrylic acid ester monomer and the N-substituted maleimide monomer to the extent that the objectives of the present disclosure are not impeded.

Examples of other copolymerizable monomers that can be used include aromatic vinyls; unsaturated nitriles; acrylic acid esters including a cyclohexyl group, a benzyl group, or an alkyl group having a carbon number of 1 to 18; glycidyl compounds; and unsaturated carboxylic acids. Examples of aromatic vinyls that can be used include styrene, α-methylstyrene, and divinylbenzene. Examples of unsaturated nitriles that can be used include acrylonitrile, methacrylonitrile, and ethacrylonitrile. Examples of acrylic acid esters that can be used include methyl acrylate, ethyl acrylate, propyl acrylate, isopropyl acrylate, and butyl acrylate. Examples of glycidyl compounds that can be used include glycidyl (meth)acrylate and allyl glycidyl ether. Examples of unsaturated carboxylic acids that can be used include acrylic acid, methacrylic acid, itaconic acid, maleic acid, and fumaric acid, and half-esterified products and anhydrides thereof.

The methacrylic resin may include just one type of structural unit derived from another copolymerizable monomer, or may include two or more types of structural units derived from other copolymerizable monomers.

The content of structural units derived from such other copolymerizable monomers relative to 100 mass % of the methacrylic resin is preferably 0 mass % to 20 mass %, more preferably 0.1 mass % to 15 mass %, and even more preferably 0.1 mass % to 10 mass %.

It is preferable for the content of structural units derived from other monomers to be within any of the ranges set forth above in terms that molding properties and mechanical properties of the resin can be enhanced without losing the intended effects of introducing a cyclic structure into the main chain.

The method used to produce the methacrylic resin including the N-substituted maleimide monomer-derived structural unit in the main chain thereof may be any polymerization method from among bulk polymerization, solution polymerization, suspension polymerization, precipitation polymerization, and emulsion polymerization, is preferably bulk polymerization, or solution polymerization, and is more preferably solution polymerization.

The polymerization process in the production method according to the present embodiment may, for example, be a batch polymerization process or a continuous polymerization process.

In the production method according to the present embodiment, the monomers are preferably polymerized by radical polymerization.

The following provides a specific description of production by batch radical polymerization using solution polymerization as one example of a method of producing the methacrylic resin including the N-substituted maleimide monomer-derived structural unit (hereinafter, also referred to as a "maleimide copolymer").

No specific limitations are placed on the polymerization solvent that is used so long as the solubility of the maleimide copolymer obtained through polymerization is high and an appropriate reaction liquid viscosity can be maintained in order to prevent gelation or the like.

Specific examples of polymerization solvents that can be used include aromatic hydrocarbons such as toluene, xylene, ethylbenzene, and isopropylbenzene; ketones such as methyl isobutyl ketone, butyl cellosolve, methyl ethyl ketone, and cyclohexanone; and polar solvents such as dimethylformamide and 2-methylpyrrolidone.

Moreover, an alcohol such as methanol, ethanol, or isopropanol may be used in combination as the polymerization solvent to the extent that dissolution of the polymerized product during polymerization is not impaired.

No specific limitations are placed on the amount of solvent used in polymerization so long as polymerization proceeds, precipitation of the copolymer or used monomers does not occur in production, and the solvent can be easily removed. For example, when the total amount of used monomers is taken to be 100 parts by mass, the amount of solvent is preferably 10 parts by mass to 200 parts by mass. The amount of solvent is more preferably 25 parts by mass to 200 parts by mass, further preferably 50 parts by mass to 200 parts by mass, and even more preferably 50 parts by mass to 150 parts by mass.

Although no specific limitations are placed on the polymerization temperature other than being a temperature at which polymerization proceeds, the polymerization temperature is preferably 50° C. to 200° C., and more preferably 80° C. to 200° C. from a viewpoint of productivity. The polymerization temperature is even more preferably 90° C. to 200° C., still more preferably 100° C. to 180° C., and yet still more preferably 110° C. to 170° C.

Although no specific limitations are placed on the polymerization time other than being a time that enables the required degree of polymerization to be obtained with the required conversion rate, the polymerization time is preferably 0.5 hours to 10 hours, and more preferably 1 hour to 8 hours from a viewpoint of productivity and so forth.

In the polymerization reaction, polymerization may be performed with addition of a polymerization initiator and/or a chain transfer agent as necessary.

The polymerization initiator may be any initiator commonly used in radical polymerization and examples thereof include organic peroxides such as cumene hydroperoxide, diisopropylbenzene hydroperoxide, di-t-butyl peroxide, lauroyl peroxide, benzoyl peroxide, t-butylperoxy isopropyl carbonate, t-amyl peroxy-2-ethylhexanoate, t-amyl peroxyisononanoate, and 1,1-di(t-butylperoxy)cyclohexane; and azo compounds such as 2,2'-azobis(isobutyronitrile), 1,1'-azobis(cyclohexanecarbonitrile), 2,2'-azobis(2,4-dimethylvaleronitrile), and dimethyl-2,2'-azobisisobutyrate.

One of these polymerization initiators may be used individually, or two or more of these polymerization initiators may be used together.

These polymerization initiators may be added at any stage so long as the polymerization reaction is in progress.

The additive amount of the polymerization initiator may be 0.01 parts to 1 parts by mass and preferably 0.05 parts to 0.5 parts by mass, relative to 100 parts by mass of the total amount of the monomers used in polymerization.

The chain transfer agent may be a chain transfer agent that is commonly used in radical polymerization and examples thereof include mercaptan compounds such as n-butyl mercaptan, n-octyl mercaptan, n-decyl mercaptan, n-dodecyl mercaptan, and 2-ethylhexyl thioglycolate; halogen compounds such as carbon tetrachloride, methylene chloride, and bromoform; and unsaturated hydrocarbon compounds such as α-methylstyrene dimer, α-terpinene, dipentene, and terpinolene.

One of these chain transfer agents may be used individually, or two or more of these chain transfer agents may be used together.

These chain transfer agents may be added at any stage, without any specific limitations, so long as the polymerization reaction is in progress.

The additive amount of the chain transfer agent when the total amount of monomers used in polymerization is taken to be 100 parts by mass may be 0.01 parts by mass to 1 part by mass, and is preferably 0.05 parts by mass to 0.5 parts by mass.

In solution polymerization, it is important to reduce the concentration of dissolved oxygen in the polymerization solution as much as possible in advance. For example, the concentration of dissolved oxygen is preferably 10 ppm or less.

The concentration of dissolved oxygen can be measured, for example, using a dissolved oxygen (DO) meter B-505 (produced by Iijima Electronics Corporation). The method by which the concentration of dissolved oxygen is reduced may be selected as appropriate from methods such as a method in which an inert gas is bubbled into the polymerization solution; a method in which an operation of pressurizing the inside of a vessel containing the polymerization solution to approximately 0.2 MPa with an inert gas and then releasing the pressure is repeated prior to polymerization; and a method in which an inert gas is passed through a vessel containing the polymerization solution.

No specific limitations are placed on the method by which a polymerized product is collected from the polymerization solution obtained through solution polymerization. Examples of methods that can be adopted include a method in which the polymerization solution is added into an excess of a poor solvent in which the polymerized product obtained through polymerization does not dissolve, such as a hydrocarbon solvent or an alcohol solvent, treatment (emulsifying dispersion) is subsequently performed using a homogenizer, and unreacted monomers are separated from the polymerization solution by pre-treatment such as liquid-liquid extraction or solid-liquid extraction; and a method in which the polymerization solvent and unreacted monomers are separated by a step referred to as a devolatilization step to collect the polymerized product.

The devolatilization step is a step in which volatile content such as the polymerization solvent, residual monomers, and reaction by-products are removed under heated vacuum conditions.

Examples of devices that can be used in the devolatilization step include devolatilization devices comprising a tubular heat exchanger and a devolatilization tank; thin film evaporators such as WIPRENE and EXEVA produced by Kobelco Eco-Solutions Co., Ltd., and Kontro and Diagonal-Blade Kontro produced by Hitachi, Ltd.; and vented extruders having sufficient residence time and surface area for displaying devolatilization capability.

Moreover, it is possible to adopt a devolatilization step or the like in which a devolatilization device that is a combination of two or more of these devices is used.

The treatment temperature in the devolatilization device is preferably 150° C. to 350° C., more preferably 170° C. to 300° C., and even more preferably 200° C. to 280° C. A temperature of 150° C. or higher is effective for preventing an excessive amount of residual volatile content. Conversely, a temperature of 350° C. or lower reduces the risk of coloring or decomposition of the resultant crylic resin.

The degree of vacuum in the devolatilization device may be 10 Torr to 500 Torr and, within this range, is preferably 10 Torr to 300 Torr. When the degree of vacuum is 500 Torr or less, volatile content has a lower tendency to remain, and when the degree of vacuum is 10 Torr or more, industrial implementation is easier.

The treatment time is selected as appropriate depending on the amount of residual volatile content and is preferably as short as possible in order to inhibit coloring or decomposition of the resultant methacrylic resin.

The polymerized product collected through the devolatilization step is pelletized through a step referred to as a pelletization step.

In the pelletization step, molten resin is extruded from a porous die as strands and is then pelletized by cold cutting pelletizing, hot cutting pelletizing, underwater pelletizing, or underwater pelletizing.

In a situation in which a vented extruder is used as a devolatilization device, the devolatilization step and the pelletization step may be combined.

—Glutarimide-Based Structural Unit—

The methacrylic resin having the glutarimide-based structural unit in the main chain is, for example, methacrylic resin having a glutarimide-based structural unit described in JP 2006-249202 A, JP 2007-009182 A, JP 2007-009191 A, JP 2011-186482 A, JP 2012/114718 X, or the like, and can be formed by the method described in the corresponding publication.

The glutarimide-based structural unit included in the methacrylic resin in the present embodiment may be formed after resin polymerization.

In detail, the glutarimide-based structural unit may be represented by the following general formula (3).

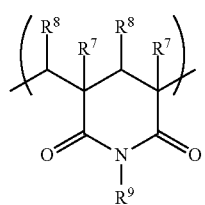

(3)

In general formula (3), it is preferable that $R^7$ and $R^8$ are each, independently of one another, hydrogen or a methyl group, and $R^9$ is hydrogen, a methyl group, a butyl group, or a cyclohexyl group, and more preferable that $R^7$ is a methyl group, $R^8$ is hydrogen, and $R^9$ is a methyl group.

The methacrylic resin may include a single type of glutarimide-based structural unit or may include two or more types of glutarimide-based structural units.

In the methacrylic resin that includes the glutarimide-based structural unit, the content of the glutarimide-based structural unit is not specifically limited so long as the ranges for the glass transition temperature that are preferable for a composition according to the present embodiment are satisfied. However, the content of the glutarimide-based structural unit relative to 100 mass % of the methacrylic resin is preferably 5 mass % to 70 mass %, and more preferably 5 mass % to 60 mass %.

It is preferable for the content of the glutarimide-based structural unit to be within any of the ranges set forth above in terms that a resin having good molding properties, heat resistance, and optical properties can be obtained.

The methacrylic resin including the glutarimide-based structural unit may further include an aromatic vinyl monomer unit as necessary.

Examples of aromatic vinyl monomers that can be used include, but are not specifically limited to, styrene and α-methylstyrene. The aromatic vinyl monomer is preferably styrene.

The content of the aromatic vinyl unit in the methacrylic resin including the glutarimide-based structural unit is not specifically limited. However, the content of the aromatic vinyl unit is preferably 0 mass % to 20 mass % relative to 100 mass % of the methacrylic resin having the glutarimide-based structural unit.

It is preferable for the content of the aromatic vinyl unit to be in any of the ranges set forth above in terms that both heat resistance and excellent photoelastic properties can be obtained.

An example of the method of manufacturing the methacrylic resin having the glutarimide-based structural unit is described below.

First, a Methacrylic acid ester polymer is produced by polymerizing Methacrylic acid ester such as methyl methacrylate. In the case of including the aromatic vinyl unit in the methacrylic resin having the glutarimide-based structural unit, Methacrylic acid ester and aromatic vinyl (e.g. styrene) are copolymerized to produce a Methacrylic acid ester-aromatic vinyl copolymer.

Next, the Methacrylic acid ester polymer or the Methacrylic acid ester-aromatic vinyl copolymer is reacted with an imidizing agent, to perform imidizing reaction (imidizing step). The methacrylic resin having the glutarimide-based structural unit can thus be produced.

The imidizing agent is not limited, and may be any imidizing agent with which the glutarimide-based structural unit expressed by General formula (3) can be generated.

In detail, the imidizing agent may be ammonia or primary amine. Examples of the primary amine include: aliphatic hydrocarbon group-containing primary amines such as methylamine, ethylamine, n-propylamine, i-propylamine, n-butylamine, i-butylamine, tert-butylamine, and n-hexylamine; and alicyclic hydrocarbon group-containing primary amines such as cyclohexylamine.

Of these imidizing agents, ammonia, methylamine, and cyclohexylamine are preferable and methylamine is particularly preferable, in terms of cost and physical property.

In the imidizing step, the content of the glutarimide-based structural unit in the obtained methacrylic resin having the glutarimide-based structural unit can be adjusted by adjusting the addition ratio of the imidizing agent.

The method for performing the imidizing reaction is not limited, and may be a conventionally known method. For example, an extruder or a batch-form reaction tank can be used to promote the imidizing reaction.

The extruder is not limited, and may be, for example, a single screw extruder, a twin screw extruder, a multi-screw extruder, or the like.

Of these, the twin screw extruder is preferable. The twin screw extruder can facilitate the mixing of the raw material polymer and the imidizing agent.

Examples of the twin screw extruder include non-inter-meshing co-rotating type, inter-meshing co-rotating type, non-inter-meshing counter-rotating type, and inter-meshing counter-rotating type.

These extruders may be used singly or in combination of two or more connected in series.

The extruder is particularly preferably provided with a vent port capable of reducing pressure to atmospheric pressure or less, because reaction byproducts such as the imidizing agent and methanol or monomers can be removed.

In the production of the methacrylic resin having the glutarimide-based structural unit, an esterification step of treating a carboxyl group in the resin by an esterification agent such as dimethylcarbonate may be included in addition to the imidizing step. Here, the treatment may be performed by also using a catalyst such as trimethylamine, triethylamine, or tributylamine.

The esterification step may be performed using, for example, an extruder or a batch-form reaction tank, as in the imidizing step.

To remove byproducts such as excessive esterification agent and methanol or monomers, the device used is preferably provided with a vent port capable of reducing pressure to atmospheric pressure or less.

The methacrylic resin that has undergone the imidizing step and optionally the esterification step is melt-extruded in strand form from the extruder equipped with the porous die, and processed in pellet form by a cold cutting method, an in-air hot cutting method, an in-water strand cutting method, an underwater cutting method, or the like.

It is also preferable to use a method of dissolving the methacrylic resin in an organic solvent such as toluene, methylethylketone, or methylene chloride, filtering the obtained methacrylic resin solution, and then devolatilizing the organic solvent, in order to reduce foreign matter in the resin.

—Lactone Ring Structural Unit—

The methacrylic resin having the lactone ring structural unit in the main chain can be, for example, formed by a method described in JP 2001-151814 A, JP 2004-168882 A, JP 2005-146084 A, JP 2006-96960 A, JP 2006-171464 A, JP 2007-63541 A, JP 2007-297620 A, or JP 2010-180305 A.

A lactone ring structural unit included in the methacrylic resin in the present embodiment may be formed after resin polymerization. The lactone ring structural unit according to the present embodiment is preferably a six-membered ring since this provides excellent cyclic structure stability.

The lactone ring structural unit that is a six-membered ring is, for example, particularly preferably a structure represented by the following general formula (4).

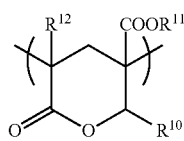

(4)

In general formula (4), $R^{10}$, $R^{11}$, and $R^{12}$ are each, independently of one another, a hydrogen atom or an organic residue having a carbon number of 1 to 20.

Examples of the organic residue include saturated aliphatic hydrocarbon groups (alkyl groups, etc.) having a carbon number of 1 to 20 such as a methyl group, an ethyl group, and a propyl group; unsaturated aliphatic hydrocarbon groups (alkenyl groups, etc.) having a carbon number of 2 to 20 such as an ethenyl group and a propenyl group; aromatic hydrocarbon groups (aryl groups, etc.) having a carbon number of 6 to 20 such as a phenyl group and a naphthyl group; and groups in which at least one hydrogen atom of any of these saturated aliphatic hydrocarbon groups, unsaturated aliphatic hydrocarbon groups, and aromatic hydrocarbon groups is substituted with at least one group selected from the group consisting of a hydroxy group, a carboxyl group, an ether group, and an ester group.

The lactone ring structure may be formed, for example, by copolymerizing an acrylic acid-based monomer having a hydroxy group and a methacrylic acid ester monomer such as methyl methacrylate to introduce a hydroxy group and an ester group or carboxyl group into the molecular chain, and then causing dealcoholization (esterification) or dehydration condensation (hereinafter, also referred to as a "cyclocondensation reaction") between the hydroxy group and the ester group or carboxyl group.

Examples of acrylic acid-based monomers having a hydroxy group that can be used in polymerization include 2-(hydroxymethyl)acrylic acid, 2-(hydroxyethyl)acrylic acid, alkyl 2-(hydroxymethyl)acrylates (for example, methyl 2-(hydroxymethyl)acrylate, ethyl 2-(hydroxymethyl)acrylate, isopropyl 2-(hydroxymethyl)acrylate, n-butyl 2-(hydroxymethyl)acrylate, and t-butyl 2-(hydroxymethyl)acrylate) and alkyl 2-(hydroxyethyl)acrylates. Moreover, 2-(hydroxymethyl)acrylic acid and alkyl 2-(hydroxymethyl) acrylates that are monomers having a hydroxyallyl moiety are preferable, and methyl 2-(hydroxymethyl)acrylate and ethyl 2-(hydroxymethyl)acrylate are particularly preferable.

No specific limitations are placed on the content of the lactone ring structural unit in the methacrylic resin including the lactone ring structural unit in the main chain thereof so long as the ranges for the glass transition temperature that are preferable for a composition according to the present embodiment are satisfied. However, the content of the lactone ring structural unit relative to 100 mass % of the methacrylic resin is preferably 5 mass % to 40 mass %, and more preferably 5 mass % to 35 mass %.

When the content of the lactone ring structural unit is within any of the ranges set forth above, effects resulting from introduction of a cyclic structure, such as improved solvent resistance and improved surface hardness, can be expressed while maintaining molding properties.

The content of the lactone ring structure in the methacrylic resin can be determined by a method described in the previously mentioned patent literature.

The methacrylic resin including the lactone ring structural unit may include constitutional units derived from other monomers that are copolymerizable with the above-described methacrylic acid ester monomer and acrylic acid-based monomer having a hydroxy group.

Examples of such other copolymerizable monomers include monomers having a polymerizable double bond such as styrene, vinyltoluene, α-methylstyrene, α-hydroxymethylstyrene, α-hydroxyethylstyrene, acrylonitrile, methacrylonitrile, methallyl alcohol, allyl alcohol, ethylene, propylene, 4-methyl-1-pentene, vinyl acetate, 2-hydroxymethyl-1-butene, methyl vinyl ketone, N-vinylpyrrolidone, and N-vinylcarbazole.

One of these other monomers (constitutional units) may be included, or two or more of these other monomers may be included.

The content of structural units derived from such other copolymerizable monomers relative to 100 mass % of the methacrylic resin is preferably 0 mass % to 20 mass %, and more preferably, from a perspective of weather resistance, less than 10 mass %, and even more preferably less than 7 mass %.

The methacrylic resin according to the present embodiment may include one type of structural unit or two or more types of structural units derived from the other copolymerizable monomers described above.

The method used to produce the methacrylic resin including the lactone ring structural unit is a method in which a lactone ring structure is formed by a cyclization reaction after polymerization. In order to promote this cyclization reaction, solution polymerization that uses a solvent is preferable.

Examples of the solvent used in polymerization include aromatic hydrocarbons such as toluene, xylene, and ethylbenzene; and ketones such as methyl ethyl ketone and methyl isobutyl ketone.

One of these solvents may be used individually, or two or more of these solvents may be used together.

No specific limitations are placed on the amount of solvent used in polymerization so long as polymerization can proceed and gelation is inhibited. However, when the total amount of monomer that is used is taken to be 100 parts by mass, the amount of solvent is, for example, preferably 50 parts by mass to 200 parts by mass, and more preferably 100 parts by mass to 200 parts by mass.

In order to sufficiently inhibit gelation of the polymerization solution and promote the cyclization reaction after polymerization, polymerization is preferably performed such that the concentration of produced polymer in the reaction mixture obtained after polymerization is 50 mass % or less, and this concentration is preferably controlled to 50 mass % or less by adding polymerization solvent to the reaction mixture as appropriate.

The method by which the polymerization solvent is added to the reaction mixture as appropriate is not specifically limited and may, for example, be through continuous addition of the polymerization solvent or intermittent addition of the polymerization solvent.

The polymerization solvent that is added may be a single type of solvent, or may be a mixed solvent of two or more types of solvents.

Although no specific limitations are placed on the polymerization temperature other than being a temperature at which polymerization proceeds, the polymerization temperature is preferably 50° C. to 200° C., and more preferably 80° C. to 180° C. from a viewpoint of productivity.

Although no specific limitations are placed on the polymerization time so long as the target conversion rate can be achieved, the polymerization time is preferably 0.5 hours to 10 hours, and more preferably 1 hour to 8 hours from a viewpoint of productivity and so forth.

In the polymerization reaction, polymerization may be performed with addition of a polymerization initiator and/or a chain transfer agent as necessary.

The polymerization initiator may be, but is not specifically limited to, any of the polymerization initiators disclosed in relation to the production method of the methacrylic resin including the N-substituted maleimide monomer-derived structural unit.

One of these polymerization initiators may be used individually, or two or more of these polymerization initiators may be used together.

The amount of polymerization initiator that is used can be set as appropriate depending on the combination of monomers, reaction conditions, and so forth, without any specific limitations. However, when the total amount of monomer used in polymerization is taken to be 100 parts by mass, the amount of polymerization initiator may be 0.05 parts by mass to 1 part by mass.

The chain transfer agent may be any chain transfer agent that is commonly used in radical polymerization and examples thereof include the chain transfer agents disclosed in relation to the production method of the methacrylic resin including the N-substituted maleimide monomer-derived structural unit.

One of these chain transfer agents may be used individually, or two or more of these chain transfer agents may be used together.

These chain transfer agents may be added at any stage, without any specific limitations, so long as the polymerization reaction is in progress.

No specific limitations are placed on the amount of chain transfer agent that is used other than being in a range that enables the desired degree of polymerization under the adopted polymerization conditions. However, when the total amount of monomer used in polymerization is taken to be 100 parts by mass, the amount of the chain transfer agent is preferably 0.05 parts by mass to 1 part by mass.

The methacrylic resin according to the present embodiment that includes the lactone ring structural unit can be obtained by performing a cyclization reaction after completion of the polymerization reaction. Therefore, the polymerization reaction liquid is preferably subjected to the lactone cyclization reaction in a solvent-containing state without removing the polymerization solvent therefrom.

The copolymer obtained through polymerization is heat treated to cause a cyclocondensation reaction between a hydroxy group and an ester group present in the molecular chain of the copolymer and thereby form a lactone ring structure.

Heat treatment for formation of the lactone ring structure may be performed, for example, using a reaction apparatus including a vacuum device or devolatilization device for removal of alcohol that may be produced as a by-product of cyclocondensation, or an extruder including a devolatilization device.

In formation of the lactone ring structure, the heat treatment may be performed in the presence of a cyclocondensation catalyst to promote the cyclocondensation reaction.

Specific examples of cyclocondensation catalysts that can be used include monoalkyl, dialkyl, and trialkyl esters of phosphorus acid such as methyl phosphite, ethyl phosphite, phenyl phosphite, dimethyl phosphite, diethyl phosphite, diphenyl phosphite, trimethyl phosphite, and triethyl phosphite; monoalkyl, dialkyl, and trialkyl esters of phosphoric acid such as methyl phosphate, ethyl phosphate, 2-ethylhexyl phosphate, octyl phosphate, isodecyl phosphate, lauryl phosphate, stearyl phosphate, isostearyl phosphate, dimethyl phosphate, diethyl phosphate, di-2-ethylhexyl phosphate, diisodecyl phosphate, dilauryl phosphate, distearyl phosphate, diisostearyl phosphate, trimethyl phosphate, triethyl phosphate, triisodecyl phosphate, trilauryl phosphate, tristearyl phosphate, triisostearyl phosphate; and organozinc compounds such as zinc acetate, zinc propionate, and zinc octyl.

One of these cyclocondensation catalysts may be used individually, or two or more of these cyclocondensation catalysts may be used together.

Although the amount of cyclocondensation catalyst that is used is not specifically limited, the amount of the cyclocondensation catalyst relative to 100 parts by mass of the methacrylic resin is, for example, preferably 0.01 parts by mass to 3 parts by mass, and more preferably 0.05 parts by mass to 1 part by mass.

Using 0.01 parts by mass or more of a catalyst is effective for improving the rate of the cyclocondensation reaction, whereas using 3 parts by mass or less of a catalyst is effective for preventing coloring of the resultant polymer and polymer crosslinking that then makes melt molding difficult.

The timing of addition of the cyclocondensation catalyst is not specifically limited. For example, the cyclocondensation catalyst may be added in an initial stage of the cyclocondensation reaction, may be added partway through the reaction, or may be added both in the initial stage and partway through the reaction.

In a situation in which the cyclocondensation reaction is carried out in the presence of a solvent, devolatilization is preferably carried out concurrently with the reaction.

Although no specific limitations are placed on the device used in a situation in which the cyclocondensation reaction and a devolatilization step are carried out concurrently, it is preferable to use a devolatilization device comprising a heat exchanger and a devolatilization tank, a vented extruder, or an apparatus in which a devolatilization device and an extruder are arranged in series, and more preferable to use a vented twin-screw extruder.

The vented twin-screw extruder is preferably a vented extruder equipped with a plurality of vent ports.

In a situation in which a vented extruder is used, the reaction treatment temperature is preferably 150° C. to 350° C., and more preferably 200° C. to 300° C. A reaction treatment temperature of 150° C. or higher is effective for preventing inadequate cyclocondensation reaction and excessive residual volatile content, whereas a reaction treatment temperature of 350° C. or lower may cause coloring or decomposition of the resultant polymer.

Moreover, in a situation in which a vented extruder is used, the degree of vacuum therein is preferably 10 Torr to 500 Torr, and more preferably 10 Torr to 300 Torr. Volatile content has a low tendency to remain when the degree of vacuum is 500 Torr or less, whereas industrial implementation is relatively simple when the degree of vacuum is 10 Torr or more.

When a cyclocondensation reaction is performed as described above, an alkaline earth metal and/or amphoteric metal salt of an organic acid is preferably added in pelletization to deactivate residual cyclocondensation catalyst.

Examples of the alkaline earth metal and/or amphoteric metal salt of an organic acid include calcium acetyl acetate, calcium stearate, zinc acetate, zinc octanoate, and zinc 2-ethylhexanoate.

After the cyclocondensation reaction step is completed, the methacrylic resin is melted and extruded as strands from an extruder equipped with a porous die, and is then pelletized by cold cutting, hot cutting in air, strand cutting in water, or under water cutting.

Imidizing for forming the glutarimide-based structural unit and lactonization for forming the lactone ring structural unit may be performed after resin production and before resin composition production (described later), or performed during resin composition production together with melt kneading of the resin and the components other than the resin.

A methacrylic resin according to the present embodiment preferably includes at least one cyclic structural unit selected from the group consisting of an N-substituted maleimide monomer-derived structural unit, a glutarimide-based structural unit, and a lactone ring structural unit. Of such cyclic structural units, it is particularly preferable that the methacrylic resin includes an N-substituted maleimide monomer-derived structural unit in terms that a high degree of control of optical properties such as the photoelastic coefficient can be easily achieved without blending with another thermoplastic resin.

—Organic Phosphorous Compound—

The organic phosphorous compound included in the methacrylic resin composition in the present embodiment is not limited as long as it is a phosphorus compound having an organic substituent (including those having P—C bond and P—O—C bond in the present embodiment). The organic phosphorous compound contains both of: an organic phosphorous compound having trivalent phosphorus in its constituent element, which is at least one type selected from phosphite esters (hereafter also referred to as "phosphites"), phosphonites, and hydrolysis products thereof; and an organic phosphorous compound having pentavalent phosphorus in its constituent element, which is at least one type selected from phosphate esters (hereafter also referred to as "phosphates"), oxidation products of the above-mentioned phosphites, and oxidation products of the above-mentioned phosphonites.

The phosphites, the phosphonites, and the phosphates are preferably bulky compounds having an aromatic ring. For example, phosphites, phosphonites, and phosphates having an aryl substituent or a pentaerythritol structure are preferable.

Typically, phosphite and phosphonate which are trivalent organic phosphorous compounds are known to be easily oxidized when heated in the presence of oxygen, and be susceptible to hydrolysis. Phosphite and phosphonate are known to generate acid P—OH and PH=O proton through hydrolysis, directly react with oxygen or hydroperoxide, and become a pentavalent organic phosphorous compound.

The organic phosphorous compound defined in this specification includes a hydrolysis product or an oxidation product generated by such hydrolysis or oxidation reaction.

Examples of the phosphite esters (phosphites) include phosphite monoester, diester, or trimester (e.g. phenyl phosphite, diphenyl phosphite, triphenyl phosphite, etc.), tris(2,4-di-t-butylphenyl)phosphite, 2-[[2,4,8,10-tetrakis(1,1-dimethylethyl)dibenzo[d,f][1,3,2]dioxaphosphepin-6-yl]oxy]-N,N-bis[2-[[2,4,8,10-tetrakis(1,1dimethylethyl)dibenzo[d,f][1,3,2]dioxaphosphepin-6-yl]oxy]-ethyl]ethanamine, diphenyltridecylphosphite, triphenylphosphite, 2,2-methylenebis(4,6-di-t-butylphenyl)octylphosphite, bis(2,6-di-t-butyl-4-methylphenyl)pentaerythritol diphosphite, distearylpentaerythritoldiphosphite, cyclic neopentanetetraylbis(2,6-di-t-butyl-4-methylphenyl)phosphite, hydrolysis products of these phosphite esters, hydrolysis products having trivalent phosphorus in their constituent element from among these hydrolysis products, and oxidation products thereof.

A commercially available phosphorus-based antioxidant is also applicable. Examples include Irgafos 168 (tris(2,4-di-t-butylphenyl)phosphite, made by BASF), JPP100 (made by Johoku Chemical Co., Ltd.: tetraphenyldipropyleneglycoldiphosphite), JPH3800 (made by Johoku Chemical Co., Ltd.: hydrogenated bisphenol A-pentaerythritol phosphite polymer), Irgafos 12 (tris[2-[[2,4,8,10-tetra-t-butyldibenzo[d,f][1,3,2]dioxaphosphepin-6-yl]oxy]ethyl]amine, made by BASF), Irgafos 38 (ethylbisphosphite (2,4-di-tert-butyl-6-methylphenyl), made by BASF), ADKSTAB HP-10 (2,2'-methylenebis(4,6-di-tert-butylphenyl)octylphosphite, made by ADEKA Corporation), ADKS TAB PEP36 (bis(2,6-di-t-butyl-4-methylphenyl)pentaerythritoldiphosphite: made by ADEKA Corporation), ADKSTAB PEP36A (bis(2,6-di-t-butyl-4-methylphenyl)pentaerythritoldiphosphite, made by ADEKA Corporation), and ADKSTAB PEP-8 (cyclic neopentanetetraylbis(2,4-di-tert-butylphenylphosphite, made by ADEKA Corporation). Other examples include Sumilizer GP (6-[3-(3-t-butyl-4-hydroxy-5-methylphenyl)propoxy]-2,4,8,10-tetra-t-butyldibenz[d,f][1,3,2]dioxaphosphepin, made by Sumitomo Chemical Co., Ltd.).

Examples of the phosphonites include tetrakis(2,4-di-tert-butylphenyl)4,4'-biphenylenediphosphonite and tetrakis(2,4-di-tert-butyl-5methylphenyl)4,4'-biphenylenediphosphite, hydrolysis products of these phosphonites, hydrolysis products having trivalent phosphorus in their constituent element from among these hydrolysis products, and oxidation products thereof.

A commercially available phosphorus-based antioxidant is also applicable. Examples include Hostanox P-EPQ (P-EPQ: tetrakis(2,4-di-tert-butylphenyl)4,4'-biphenylenediphosphonite, made by Clariant Co. Ltd), and GSY-P101 (tetrakis(2,4-di-t-butyl-5methylphenyl)4,4'-biphenylenediphosphonite, made by Sakai Chemical Industry Co., Ltd.).

Examples of the phosphate esters (phosphates) include: acid phosphate esters such as 2-ethylhexyl acid phosphate, isodecyl acid phosphate, oleyl acid phosphate, and bis(2-ethylhexyl)hydrogen phosphite; diaryl phosphates such as ethylenebis(diphenyl phosphate), propylenebis(diphenyl phosphate), phenylenebis(diphenyl phosphate), and naphthylenebis(ditoluyl phosphate); phosphate monoesters, diesters, or triesters such as bisphenol A bis(diphenyl phosphate), 2-ethylhexyl phosphate, octyl phosphate, isodecyl phosphate, lauryl phosphate, stearyl phosphate, isostearyl phosphate, phenyl phosphate, di-2-ethylhexyl phosphate, diisodecyl phosphate, dilauryl phosphate, distearyl phosphate, diisostearyl phosphate, diphenyl phosphate, triisodecyl phosphate, trilauryl phosphate, tristearyl phosphate, triisostearyl phosphate, and triphenyl phosphate; hydrolysis products of these phosphate esters; and hydrolysis products having pentavalent phosphorus in their constituent element from among the hydrolysis products of these phosphate esters.

(Method of Manufacturing Methacrylic Resin Composition)

The method of manufacturing the methacrylic resin composition in the present embodiment is not limited as long as a composition satisfying the requirements according to this disclosure is obtained.

Examples of the manufacturing method include: a method of causing the organic phosphorous compound to coexist with the monomers in polymerization; a method of adding the organic phosphorous compound before the devolatilization step of removing residual monomers and polymerization solvent after the end of solution polymerization; a method of adding the organic phosphorous compound when pelletizing the polymerization product collected after the devolatilization step (including the cases of simultaneously blending other thermoplastic resin); and a method of adding the organic phosphorous compound directly or as master batch pellet when performing pelletizing using an extruder equipped with a vent port or a side feed device after the end of the devolatilization step and again performing pelletizing using a melt kneading device such as an extruder (including the cases of simultaneously blending other thermoplastic resin).

In the case where a melt extrusion method is used as the composition preparation method, a method of preparing the composition while removing residual volatile components as much as possible using a vent-equipped extruder is preferable.

In the case where the methacrylic resin composition in the present embodiment is used for a film or the like, it is also preferable to perform a preparation method that additionally uses, in a filter device, a sintered filter, a pleated filter, a leaf disc polymer filter, or the like with filter precision of 1.5 μm to 20 μm in any one or more steps from among the polymerization reaction step, the liquid-liquid separation step, the liquid-solid separation step, the devolatilization step, the pelletizing step, and the molding step, in order to reduce foreign matter.

Regardless of which method is selected, the composition including the organic phosphorous compound according to the present embodiment is preferably prepared with oxygen and water having been reduced as much as possible.

For example, the dissolved oxygen concentration in the polymerization solution in solution polymerization is preferably less than 300 ppm in the polymerization step. In a preparation method using an extruder and the like, the oxygen concentration in the extruder is preferably less than 1 vol %, and further preferably less than 0.8 vol %.

The water content of the methacrylic resin is preferably adjusted to 1000 mass ppm or less, and more preferably adjusted to 500 mass ppm or less.

Within such ranges, a composition satisfying the requirements according to this disclosure can be prepared relatively easily.

For example, in the case of employing a manufacturing method using an extruder, it is preferable to increase the temperature of the pelletized methacrylic resin and organic phosphorous compound as raw material under reduced pressure or dehumidified air so as to sufficiently dry them beforehand and remove water as much as possible, and mix and feed them to the extruder.

Moreover, to minimize the contamination of oxygen into the extruder and prevent oxidation of the composition in a molten state, it is preferable to flow inert gas such as nitrogen gas into the extruder and perform operation with pressure reduction and exhaust, through the use of a vent-equipped extruder.

The drying temperature of the raw material and the like in such a case is preferably 40° C. to 120° C., and more preferably 70° C. to 100° C.

The pressure reduction degree is not limited. Particularly in the case of using a powdery organic phosphorous compound, for example, the pressure reduction degree may be selected as appropriate while performing treatment such as attaching the organic phosphorous compound to the methacrylic resin using a loading agent or the like beforehand and preventing scattering.

The methacrylic resin composition in a molten state as a result of melt kneading using the extruder is melt-extruded from the porous die to be pelletized.

The pelletizing method used here is, for example, an in-air hot cutting method, a watering hot cutting method, a cold cutting method, an in-water strand cutting method, or an underwater cutting method.

To obtain such a methacrylic resin composition that contains the organic phosphorous compound whose existence state is highly controlled as in the present embodiment, it is preferable to use a pelletizing method that can quickly cool and solidify the composition in a molten state at high temperature while minimizing its contact with air.

For this purpose, for example, a watering hot cutting method, a cold cutting method, an in-water strand cutting method, and an underwater cutting method are preferable. In terms of productivity and pelletizing device cost, a water cooling strand cutting method is typically more preferable.

In such a case, pelletizing is more preferably performed under the conditions that the molten resin temperature is as low as possible, the residence time from the porous die exit to the cooling water surface is as short as possible, and the temperature of cooling water is as high as possible.

For example, the molten resin temperature is preferably 240° C. to 300° C., and more preferably 250° C. to 290° C. The residence time from the porous die exit to the cooling water surface is preferably 5 sec or less, and more preferably 3 sec or less. The temperature of cooling water is preferably 30° C. to 80° C., and more preferably 40° C. to 60° C.

The properties of the methacrylic resin composition in the present embodiment are described in detail below.

In the methacrylic resin composition in the present embodiment, the content of the phosphorus element is 10 mass ppm to 1000 mass ppm. The content of the phosphorus element is preferably 20 mass ppm to 500 mass ppm, and further preferably 50 mass ppm to 300 mass ppm.

If the content of the phosphorus element is less than 10 mass ppm, there is a possibility that heat or oxygen-induced decomposition of the methacrylic resin composition having a high glass transition temperature as in the present embodiment cannot be suppressed sufficiently.

If the content of the phosphorus element is more than 1000 mass ppm, there is a possibility that, in the case of performing melt kneading at high temperature using the methacrylic resin composition having a high glass transition temperature as in the present embodiment, a large amount of generated decomposition product or oxidation product exists in the composition, which facilitates aggregated foreign matter formation or side reaction such as crosslinking, makes melt processing unstable by, for example, increasing clogging of the filter provided in the extruder, or decreases the quality of the obtained product due to a decomposition product and the like included in the volatile component during melt molding by, for example, an increase of foreign matter in the film or the formation of stripe-like objects or silver streaks on its surface.

The content of the phosphorus element in the composition can be measured using a fluorescent X-ray analyzer. For example, the content can be measured by a SQX-order analysis method using fluorescent X-ray ZSXPrimusII made by Rigaku Corporation.

In addition, regarding the organic phosphorous compound contained in the methacrylic resin composition in the present embodiment, the ratio (P3/P5) of the integral value (P3) of the spectral peak assigned to trivalent phosphorus to the integral value (P5) of the spectral peak assigned to pentavalent phosphorus in $^{31}$P-NMR measurement is 0.2 to 5.0. The ratio (P3/P5) is preferably 0.5 to 3.0, and further preferably 0.6 to 2.0.

If the ratio is less than 0.2, there is a possibility that, when using the composition in the present embodiment to obtain a film or a molded product, not only heat or oxygen-induced decomposition cannot be suppressed sufficiently, but also aggregated foreign matter forms due to generated decomposition product or oxidation product and causes an increase of foreign matter in the film or stripe-like objects or silver streaks on its surface.

If the ratio is more than 5.0, there is a possibility that clogging of the filter provided in the extruder increases, or foreign matter in the film increases or stripe-like objects or silver streaks form on its surface.

The ratio (P3/P5) in the present embodiment can be calculated from spectral peaks obtained using $^{31}$P-NMR. In detail, for example, the measurement can be performed using a Fourier transform nuclear magnetic resonance device (AVANCE III 500HD Prodigy) made by Bruker BioSpin, under the following conditions: observation frequency: 202 MHz, cumulative number: 50000, detection pulse flip angle: 30°, delay time: 2 sec, pulse program: zg30, measurement temperature: room temperature, solvent used: CDCl$_3$, and internal standard substance: hexamethyl phosphoric triamide.

As more detailed measurement sample solution preparation conditions, the method described in the below-mentioned Examples may be used.

It is known that, in the preparation of methacrylic resin containing a structural unit (X) having a cyclic structure-containing main chain, in the case where a monomer having the ring structure is polymerized by solution polymerization with a polymerization solvent used together with a small amount of alcohol or the ring structure is introduced into the main chain by cyclization reaction, the solvent used or alcohol (e.g. methanol) which is a byproduct associated with cyclization reaction remains in the composition to no small extent, even when a devolatilization step is included in the manufacturing process.

As a result of repeatedly conducting extensive research, we discovered that the amounts of the solvent and alcohol (e.g. methanol) remaining in the methacryl resin composition is important in order to control the ratio (P3/P5) of the integral value (P3) of the spectral peak assigned to trivalent phosphorus to the integral value (P5) of the spectral peak assigned to pentavalent phosphorus, which is calculated in $^{31}$P-NMR measurement, to be in the specific range.

The amount of residual solvent (residual solvent amount) in the methacrylic resin composition in the present embodiment is preferably less than 1000 mass ppm, more preferably less than 800 mass ppm, and further preferably less than 700 mass ppm.

The residual solvent mentioned here is a polymerization solvent (excluding alcohol) used in polymerization and a solvent used when dissolving the resin obtained by polymerization to form a solution. Examples of the polymerization solvent include: aromatic hydrocarbons such as toluene, xylene, ethylbenzene, and isopropylbenzene; ketones such as methylisobutylketone, butylcellosolve, methylethylketone, and cyclohexanone; and polar solvents such as dimethyl formamide and 2-methylpyrrolidone. Examples of the solvent used for dissolving include toluene, methylethylketone, and methylene chloride.

The amount of residual alcohol (residual alcohol amount) in the methacrylic resin composition in the present embodiment is preferably less than 500 mass ppm, more preferably less than 400 mass ppm, and further preferably less than 350 mass ppm.

The residual alcohol mentioned here is alcohol used together with other polymerization solvent in polymerization and alcohol as a byproduct of cyclization condensation reaction. Examples of the residual alcohol include aliphatic alcohols such as methanol, ethanol, and isopropanol.

The residual solvent amount and the residual alcohol amount can be measured by gas chromatography.

Moreover, in the methacrylic resin composition in the present embodiment, the weight-average molecular weight (Mw) as measured by a GPC measurement method is preferably 90,000 to 200,000, more preferably 100,000 to 170,000, further preferably 100,000 to 150,000, and particularly preferably 120,000 to 150,000, as a polymethyl methacrylate equivalent value.

We discovered that, by selecting this range for the weight-average molecular weight (Mw) in addition to controlling the residual solvent amount and the residual alcohol amount, the ratio (P3/P5) calculated in $^{31}$P-NMR measurement for the composition is easily limited to the specific range.

If the weight-average molecular weight (Mw) is in this range, excellent balance between mechanical strength and flowability can be achieved. The molecular weight distribution (weight-average molecular weight (Mw)/number-average molecular weight (Mn)) is not limited. In view of the balance between flowability and mechanical strength, the molecular weight distribution is preferably 1.5 to 5, more preferably 1.5 to 4.5, further preferably 1.6 to 4, still more preferably 1.6 to 3, and still further preferably 1.5 to 2.5.

The weight-average molecular weight (Mw) and number-average molecular weight (Mn) of the methacrylic resin composition can be specifically measured by the method described in the below-mentioned Examples.

The glass transition temperature (Tg) of the methacrylic resin composition in the present embodiment is more than 120° C. and 160° C. or less.

If the glass transition temperature of the methacrylic resin composition is more than 120° C., sufficient heat resistance necessary for lens molded products and liquid crystal display film molded product optical films in recent years can be achieved more easily.

In terms of dimensional stability at use environment temperature, the glass transition temperature (Tg) is more preferably 125° C. or more, and further preferably 130° C. or more.

If the glass transition temperature (Tg) of the methacryl resin composition is more than 160° C., the temperature in melt processing needs to be considerably high, which tends to cause thermal decomposition of the resin and the like and make it difficult to obtain a favorable product by melt processing.

For these reasons, the glass transition temperature (Tg) is preferably 150° C. or less.

The glass transition temperature (Tg) can be determined through measurement according to JIS-K7121. The glass transition temperature (Tg) can be specifically measured by the method described in the below-mentioned Examples.

The absolute value of the photoelastic coefficient $C_R$ of the methacrylic resin composition containing the methacrylic resin that includes the structural unit (X) having the cyclic structure-containing main chain in the present embodiment is preferably $3.0\times10^{-12}$ $Pa^{-1}$ or less, more preferably $2.0\times10^{-12}$ $Pa^{-1}$ or less, and further preferably $1.0\times10^{-12}$ $Pa^{-1}$ or less.

The photoelastic coefficient is described in various documents (e.g. Kagaku Sosetsu, No. 39, 1998 (Gakkai Shuppan Center)), and is defined by the following Formulas (i-a) and (i-b). It can be understood that, when the photoelastic coefficient $C_R$ is closer to zero, the birefringence change by an external force is smaller.

$$C_R=|\Delta n|/\sigma_R \quad \text{(i-a)}$$

$$|\Delta n|=|nx-ny| \quad \text{(i-b).}$$

(In the formulas, $C_R$ is the photoelastic coefficient, $\sigma_R$ is the stretching stress, $|\Delta n|$ is the absolute value of birefringence, nx is the refractive index in the stretching direction, and ny is the refractive index in the direction perpendicular to the stretching direction in plane.)

If the absolute value of the photoelastic coefficient $C_R$ of the methacrylic resin composition in the present embodiment is $3.0\times10^{-12}$ $Pa^{-1}$ or less, when the composition is made into a film and used in a liquid crystal display device, phase difference unevenness, lower contrast in a display screen peripheral part, and light leakage can be reduced or prevented.

The photoelastic coefficient $C_R$ of the methacrylic resin composition can be specifically measured by the method described in the below-mentioned Examples.

The transmittance of the methacrylic resin composition in the present embodiment in a wavelength range of 500 nm to 600 nm is preferably 94% or more, more preferably 97% or more, and further preferably 98% or more. The methacrylic resin composition in this range can be used for a sheet-like molded product thicker than a film, a light guide plate, and the like.

The transmittance can be specifically measured by the method described in the below-mentioned Examples.

—Other Thermoplastic Resins—

Another thermoplastic resin may be compounded in production of the methacrylic resin composition according to the present embodiment with the aim of adjusting birefringence or improving flexibility, so long as the objectives of the present embodiment are not impeded.

Examples of other thermoplastic resins that can be used include polyacrylates such as polybutyl acrylate; styrene polymers (for example, polystyrene, styrene-methyl methacrylate copolymer, styrene-butyl acrylate copolymer, styrene-acrylonitrile copolymer, and acrylonitrile-butadiene-styrene block copolymer); acrylic rubber particles having a 3 or 4 layer structure described in JP S59-202213 A, JP S63-27516 A, JP S51-129449 A, and JP S52-56150 A; rubbery polymers disclosed in JP S60-17406 B and JP H8-245854 A; and methacrylic rubber-containing graft copolymer particles obtained by multi-step polymerization described in WO 2014-002491 A1.

Of these other thermoplastic resins, from a viewpoint of obtaining good optical properties and mechanical properties, it is preferable to use a styrene-acrylonitrile copolymer or rubber-containing graft copolymer particles having a grafted portion in a surface layer thereof with a chemical composition that is compatible with the methacrylic resin including the structural unit (X) having a cyclic structure-containing main chain.

The average particle diameter of acrylic rubber particles, methacrylic rubber-containing graft copolymer particles, or a rubbery polymer such as described above is preferably 0.03 μm to 1 μm, and more preferably 0.05 μm to 0.5 μm from a viewpoint of improving impact strength, optical properties, and so forth of a film obtained using the composition according to the present embodiment.

The content of other thermoplastic resins relative to 100 parts by mass of the methacrylic resin is preferably 0 parts by mass to 50 parts by mass, and more preferably 0 parts by mass to 25 parts by mass.

—Additives—

The methacrylic resin composition in the present embodiment may contain various additives within the range of not significantly undermining the advantageous effects according to the present embodiment.

The additives are not limited. Examples include inorganic fillers; pigments such as iron oxide; softeners/plasticizers such as stearic acid, behenic acid, zinc stearate, calcium stearate, magnesium stearate, and ethylenebisstearoamide; softeners/plasticizers such as paraffin-based process oil, naphthene-based process oil, aromatic-based process oil, paraffin, organic polysiloxane, and mineral oil; antioxidants such as hindered phenol-based antioxidant and sulfur-based antioxidant; hindered amine-based light stabilizers; benzotriazole-based ultraviolet absorbers; flame retardants; antistatic agents; reinforcing agents such as organic fiber, glass fiber, carbon fiber, and metal whisker; coloring agents; other additives; and mixtures thereof.

EXAMPLE

The following provides a more specific description of the disclosed matter through examples and comparative examples. However, this disclosure is not limited to the following examples.

<1. Analysis of Structural Units>

Unless otherwise noted in each of the Production Examples described below, the structural unit of the methacrylic resin produced in the Production Example was identified and its existence amount was calculated by $^1$H-NMR measurement and $^{13}$C-NMR measurement. The measurement conditions of $^1$H-NMR measurement and $^{13}$C-NMR measurement were as follows:

Measurement device: DPX-400 produced by Bruker Corporation.

Measurement solvent: $CDCl_3$ or DMSO-$d_6$.

Measurement temperature: 40° C.

In the case of a methacrylic resin having a lactone ring structure as the cyclic structure thereof, this structure was confirmed by a method described in JP 2001-151814 A or JP 2007-297620 A, and in the case of a methacrylic resin having a glutarimide cyclic structure as the cyclic structure thereof, this structure was confirmed by a method described in WO 2012/114718 A1.

<2. Measurement of Molecular Weight and Molecular Weight Distribution>

The weight-average molecular weight (Mw) and number-average molecular weight (Mn) of the methacrylic resin produced in each of the below-mentioned Production Examples and the methacrylic resin composition produced in each of the below-mentioned examples and comparative examples were measured by the following device and conditions:

Measurement device: Gel permeation chromatograph (HLC-8320GPC) produced by Tosoh Corporation Measurement conditions Column: TSK guard column Super H-H×1, TSK gel Super HM-M×2, TSK gel Super H2500×1; connected in series in this order Column temperature: 40° C.

Developing solvent: Tetrahydrofuran, 0.6 mL/min flow rate, 0.1 g/L of 2,6-di-t-butyl-4-methylphenol (BHT) added as internal standard Detector: Refractive index (RI) detector Detection sensitivity: 3.0 mV/min Sample: Solution of 0.02 g of methacrylic resin or methacrylic resin composition in 20 mL of tetrahydrofuran Injection amount: 10 μL Standard samples for calibration curve: Following 10 types of polymethyl methacrylate (PMMA Calibration Kit M-M-10 produced by Polymer Laboratories Ltd.) of differing molecular weight each having a known monodisperse weight peak molecular weight Weight peak molecular weight (Mp)

Standard sample 1: 1,916,000
Standard sample 2: 625,500
Standard sample 3: 298,900
Standard sample 4: 138,600
Standard sample 5: 60,150
Standard sample 6: 27,600
Standard sample 7: 10,290
Standard sample 8: 5,000
Standard sample 9: 2,810
Standard sample 10: 850

The RI detection intensity was measured with respect to the elution time of the methacrylic resin or methacrylic resin composition under the conditions set forth above.

The weight average molecular weight (Mw) and the number average molecular weight (Mn) of the methacrylic resins and methacrylic resin compositions were determined based on calibration curves obtained through measurement of the calibration curve standard samples, and then Mw/Mn was calculated using the determined values.

<3. Glass Transition Temperature>

The glass transition temperature (Tg) (° C.) of the methacrylic resin composition was measured according to JIS-K7121.

First, from each sample subjected to state adjustment (left for one week at 23° C.) in a standard state (23° C., 65% RH), test pieces at four points (four locations) of about 10 mg each were cut out.

Next, using a differential scanning calorimetry (Diamond DSC made by PerkinElmer Japan Co., Ltd.) under conditions of a nitrogen gas flow rate of 25 mL/min, the temperature was increased from room temperature (23° C.) to 200° C. at 10° C./min (primary temperature rise), and maintained at 200° C. for 5 min to completely melt the sample. After this, the temperature was decreased from 200° C. to 40° C. at 10° C./min, maintained at 40° C. for 5 min, and then increased again under the above-mentioned temperature rise conditions (secondary temperature rise). In the DSC curve drawn during this, the intersection point (intermediate-point glass transition temperature) between the stepped change portion curve during the secondary temperature rise and the straight line at equal distance in the vertical axis direction from each baseline extension was measured as the glass transition temperature (Tg) (° C.). Four points were subjected to measurement per sample, and the arithmetic mean of the four points (rounded off to the closest whole number) was set as the measurement value.

<4. Determination of Content of Phosphorus Element>

The content (mass ppm) of the phosphorus element in the methacrylic resin composition produced in each of the below-mentioned examples and comparative examples was measured by the following device and conditions:

Measurement device: fluorescent X-ray analyzer (ZSXPrimusll) made by Rigaku Corporation.

Measurement method: SQX-order analysis method.

3 g of each frozen and crushed sample was charged into a ring made of vinyl chloride with a diameter of 30 mm, solidified by a pressure molding machine, and used for measurement.

<5. Determination of Ratio (P3/P5) of Integral Value (P3) of Spectral Peak Assigned to Trivalent Phosphorus to Integral Value (P5) of Spectral Peak Assigned to Pentavalent Phosphorus>

The ratio (P3/P5) of the methacrylic resin composition produced in each of the below-mentioned examples and comparative examples was determined by $^{31}$P-NMR.

The measurement conditions of $^{31}$P-NMR were as follows:

Measurement device: Fourier transform nuclear magnetic resonance device (AVANCE III 500HD Prodigy) made by Bruker BioSpin K.K.

Measurement condition:

Observation frequency: 202 MHz, cumulative number: 50000.

Detection pulse flip angle: 30°, delay time: 2 sec.

Pulse program: zg30.

Measurement temperature: room temperature.

Solvent used: $CDCl_3$, with hexamethylphosphoric triamide added as internal standard substance.

200 mg of the sample was dissolved in 1 mL of $CDCl_3$ with the internal standard substance added beforehand, charged into a 5 mmφ sample tube, and used for measurement.

From the obtained spectra, P3/P5 was calculated as the existence ratio where P3 is the integral value of the spectral peak observed between 90 ppm and 140 ppm and P5 is the integral value of the spectral peak observed between 20 ppm and −30 ppm.

<6. Measurement of Photoelastic Coefficient $C_R$>

Each of the methacrylic resin compositions obtained in the examples and comparative examples was formed into a pressed film using a vacuum compression molding machine to obtain a measurement sample.

Specifically, the sample was prepared by using a vacuum compression molding machine (SFV-30 produced by Shinto Metal Industries Corporation) to pre-heat the resin composition for 10 minutes at 260° C. under vacuum (approximately 10 kPa) and subsequently compress the resin composition for 5 minutes at 260° C. and approximately 10 MPa, and by then releasing the vacuum and press pressure and transferring the resin composition to a compression molding machine for cooling in which the resin composition was cooled and solidified. The resultant pressed film was cured for at least 24 hours in a constant temperature and constant humidity chamber adjusted to a temperature of 23° C. and a humidity of 60%, and then a measurement specimen (thickness: approximately 150 μm, width: 6 mm) was cut out therefrom.

The photoelastic coefficient $C_R$ (Pa$^{-1}$) was measured using a birefringence measurement device that is described in detail in Polymer Engineering and Science 1999, 39, 2349-2357.

The film-shaped specimen was set in a film tensing device (produced by Imoto Machinery Co., Ltd.) set up in the same constant temperature and constant humidity chamber such that the chuck separation was 50 mm. Next, a birefringence measurement device (RETS-100 produced by Ostuka Electronics Co., Ltd.) was set up such that a laser light path of the device was positioned in a central portion of the film. The birefringence of the specimen was measured while applying tensile stress with a strain rate of 50%/min (chuck separation: 50 mm, chuck movement speed: 5 mm/min).

The photoelastic coefficient ($C_R$) (Pa$^{-1}$) was calculated by making a least squares approximation of the relationship between the absolute value (|Δn|) of the measured birefringence and the tensile stress ($\sigma_R$) and then determining the gradient of the resultant straight line. This calculation was performed using data in a tensile stress range of 2.5 MPa≤$\sigma_R$≤10 MPa.

$$C_R = |\Delta n|/\sigma_R$$

Note that the absolute value (|Δn| of birefringence is a value shown below.

$$|\Delta n| = |nx - ny|$$

(nx: refractive index of tension direction; ny: refractive index of in-plane direction perpendicular to tension direction)

<7. Measurement of Residual Solvent Amount and Residual Alcohol Amount>

The residual solvent amount and alcohol amount (mass ppm) in the methacrylic resin obtained in each of the below-mentioned Production Examples and the methacrylic resin composition obtained in each of the below-mentioned examples and comparative examples were measured using gas chromatography (GC-2010 made by Shimadzu Corporation).

The sample was dissolved in chloroform, and a 5 mass % solution was adjusted. A solution obtained by adding n-decane to this solution as an internal standard substance was used for measurement.

<8. Film Formation Evaluation of Methacrylic Resin Composition>

The pellet-shaped resin composition obtained in each of the below-mentioned examples and comparative examples was dried at 90° C. for 24 hours by dehumidified air, to reduce the water content to 300 mass ppm or less. After this, film formation was performed by the following two methods of method A and method B:

Method A: a film was prepared using a 15 mmϕ twin screw extruder (made by TECHNOVEL Corporation) with a T die of 300 mm in width installed at its extruder tip portion. The film formation conditions were as follows: extruder tip portion set temperature: 260° C., T die temperature setting: 255° C., discharge rate: 1 kg/hr, and cooling roll set temperature: glass transition temperature −10° C. A film with a film thickness of 80 μm was thus obtained. After continuous operation for 6 hours under these conditions, an evaluation film of 1 m in length was collected.

Method B: a film was prepared using a 65 mmϕ single screw extruder with a filter (leaf filter made by Nagase & Co., Ltd.) for resin filtering and a T die of 1000 mm in width installed at its extruder tip portion. The film formation conditions were as follows: extruder tip portion set temperature: 260° C., T die temperature setting: 255° C., discharge rate: 100 kg/hr, and cooling roll set temperature: glass transition temperature −10° C. A film with a film thickness of 150 μm was thus obtained. After continuous operation for 6 hours under these conditions, an evaluation film of 1 m in length was collected.

In this example, in the case where the evaluation result in method B was not significantly lower than the evaluation result in method A, it was determined that a molded product with favorable moldability and favorable quality can be obtained even in larger-scale and harsher melt processing.

<9. Evaluation of Aggregates in Molded Product>

The following method was used to evaluate the aggregate formation state by melt processing.

The obtained film was finely cut and used as a sample. A predetermined amount of the sample was collected so that the solution concentration was 20 w/v % (i.e. a solution produced by dissolving 10 g of the sample in chloroform to obtain a 50 mL solution) and charged into chloroform, and the sample was dissolved by stirring to prepare a solution including the composition. The solution was then charged into a cell with an optical path length of 100 mm, and the average transmittance (%) in a wavelength range of 500 nm to 600 nm was measured using an ultraviolet spectrometer (UV-2500PC made by Shimadzu Corporation). This operation was repeatedly performed five times to perform the measurement, and their average value was set as the result.

A conventional in-film foreign matter amount evaluation method is, for example, a method of making a sample into a solution and then evaluating foreign matter of a specific size or more by a particle counter or visually observing the thin-film sample. For small-size aggregates which form during melt processing, however, sufficient evaluation may be impossible. Accordingly, this example employed the method of evaluating the transmittance using a long optical path length cell in the above-mentioned wavelength range in a high concentration solution of a sample.

<10. Evaluation of Film Formability>

(10-i. Casting Roll Stain State in Film Formation)

A roll sufficiently cleaned before the start of film formation was used, and stains on the roll surface after 6 hours were visually observed. Each sample with the roll surface being roughly unchanged from that before the film formation and only a small part being slightly stained was evaluated as "excellent", each sample with the whole roll surface being slightly stained was evaluated as "good", each sample with the whole roll surface being stained and required for recleaning was evaluated as "poor".

(10-ii. Evaluation of Film Stripe Defects)

The film obtained after film formation for 6 hours was cut to a width of 200 mm and a length of 500 mm, projected onto a screen using a point light source, and stripes (including silver streaks) in the longitudinal direction and the transverse direction appearing as shadows were evaluated as defects. This was repeatedly performed five times from the cutting to perform the measurement, and their average value was set as the result.

The case where no stripe defect was observed was evaluated as "excellent", the case where the number of defects with a length of 10 mm or more was less than 5 was evaluated as "good", and the case where the number of defects with a length of 10 mm or more was 10 or more was evaluated as "poor".

These results are listed in Table 1.

[Raw Materials]

Raw materials used in the following examples and comparative examples were as shown below.

[[Monomers]]

Methyl methacrylate: produced by Asahi Kasei Chemicals Corporation

N-phenylmaleimide (phMI): produced by Nippon Shokubai Co., Ltd.

N-cyclohexylmaleimide (chMI): produced by Nippon Shokubai Co., Ltd.

2-(hydroxymethyl)methyl acrylate (MHMA): produced by Combi-Blocks Inc.

Monomethylamine: produced by Mitsubishi Gas Chemical Company, Inc.

[[Organic Phosphorous Compound]]

A-1: tris(2,4-di-t-butylphenyl)phosphite

A-2: stearyl phosphate/distearyl phosphate mixture (Sakai Chemical Industry Co., Ltd.)

A-3: bis(2,6-di-t-butyl-4-methylphenyl)pentaerythritoldiphosphite

A-4: (6-[3-(3-t-butyl-4-hydroxy-5-methylphenyl)propoxy]-2,4,8,10-tetra-t-butyldibenz[d,f][1,3,2]dioxaphosphepin (Sumitomo Chemical Co., Ltd.: Sumilizer GP)

A-5: 2,2'-methylenebis(4,6-di-tert-butylphenyl)octylphosphite

A-6: tetrakis(2,4-di-t-butyl-5methylphenyl)4,4'biphenylenediphosphonite

A-7: bisphenol A bis(diphenylphosphate)

[Production Example 1-1]: Production of Methacrylic Resin Having N-Substituted Maleimide Monomer-Derived Structural Unit A mixed monomer solution was prepared by measuring out 450.7 kg of methyl methacrylate (hereafter referred to as "MMA"), 39.8 kg of N-phenylmaleimide (hereafter referred to as "phMI"), 59.7 kg of N-cyclohexylmaleimide (hereafter referred to as "chMI"), 0.41 kg of N-octylmercaptan as a chain transfer agent, and 450 kg of m-xylene (hereafter referred to as "mXy"), adding these material into a 1.25 m³ reactor that had been purged with nitrogen in advance, and then stirring these materials.

The mixed monomer solution was then subjected to nitrogen bubbling at a rate of 100 mL/min for 6 hours, dissolved oxygen was removed, and the temperature was increased to 124° C.

Next, a polymerization initiator solution obtained by dissolving 0.30 kg of 1,1-di-t-butylperoxycyclohexane as a polymerization initiator in 3.85 kg of mXy was added at a rate of 1 kg/hr, thus starting polymerization.

After 10 hours from the start of polymerization, a polymerization solution including methacrylic resin having a cyclic structure-containing main chain was obtained.

This polymerization solution was fed into a concentrating device comprising a tubular heat exchanger and a vaporization tank that had been pre-heated to 170° C., to increase the concentration of the polymer in the solution to 70 mass %.

The resultant polymerization solution was fed into a thin-film evaporator having a heat transfer area of 0.2 m², and was subjected to devolatilization. The conditions used here were as follows: in-device temperature: 280° C., feed rate: 30 L/hr, rotational speed: 400 rpm, and degree of vacuum: 30 Torr. The polymer subjected to devolatilization was then pressurrized using a gear pump, extruded from a strand die, cooled by water, and then pelletized.

As a result of checking the composition of the resultant polymer (1-1), the respective structural units derived from MMA, phMI, and chMI monomers were 81.3 mass %, 7.9 mass %, and 10.8 mass %. The weight-average molecular weight was 145,000, and the resultant polymer contained 770 mass ppm of m-xylene.

Production Example 1-2

Polymerization was performed by the same method as in Production Example 1-1 except that methyl methacrylate was changed to 503.5 kg, N-phenylmaleimide was changed to 17.2 kg, N-cyclohexylmaleimide was changed to 29.5 kg, the usage of the polymerization initiator was changed to 0.49 kg, and the usage of the chain transfer agent was changed to 0.62 kg. A polymer was thus obtained.

As a result of checking the composition of the resultant polymer (1-2), the respective structural units derived from MMA, phMI, and chMI monomers were 90.3 mass %, 4.0 mass %, and 5.7 mass %. The weight-average molecular weight was 115,000, and the resultant polymer contained 530 mass ppm of m-xylene.

Production Example 1-3

Polymerization was performed by the same method as in Production Example 1-1 except that the usage of the polymerization initiator was changed to 0.23 kg and the chain transfer agent was not used. A polymer was thus obtained.

The weight-average molecular weight of the resultant polymer (1-3) was 235,000, and the resultant polymer contained 950 mass ppm of m-xylene.

Production Example 1-4

Polymerization was performed by the same method as in Production Example 1-1 except that the usage of the chain transfer agent was changed to 0.80 kg. A polymer was thus obtained.

The weight-average molecular weight of the resultant polymer (1-4) was 89,000, and the resultant polymer contained 300 mass ppm of m-xylene.

Production Example 1-5

Polymerization was performed by the same method as in Production Example 1-1 except that the degree of vacuum in the thin-film evaporator was changed to 200 Torr. A polymer was thus obtained. The weight-average molecular weight of the resultant polymer (1-5) was 148,000, and the resultant polymer contained 2250 mass ppm of m-xylene.

Production Example 1-6

Polymerization was performed by the same method as in Production Example 1-1 except that the degree of vacuum in the thin-film evaporator was changed to 500 Torr. A polymer was thus obtained. The weight-average molecular weight of the resultant polymer (1-6) was 150,000, and the resultant polymer contained 7180 mass ppm of m-xylene.

Production Example 1-7

Polymerization was performed by the same method as in Production Example 1-1 except that the usage of methyl methacrylate was changed to 500 kg, the usage of N-phenylmaleimide was unchanged, the usage of N-cyclohexylmaleimide was changed to 10.4 kg, and the usage of the chain transfer agent was changed to 0.17 kg. A polymer was thus obtained.

As a result of checking the composition of the resultant polymer (1-7), the respective structural units derived from MMA, phMI, and chMI monomers were 90.2 mass %, 7.9 mass %, and 1.9 mass %. The weight-average molecular weight of the resultant polymer was 172,000, and the resultant polymer contained 690 mass ppm of m-xylene.

Production Example 1-8

Polymerization was performed by the same method as in Production Example 1-1 except that the usage of methyl methacrylate was changed to 351.2 kg, the usage of N-phenylmaleimide was changed to 79.6 kg, and the usage of N-cyclohexylmaleimide was changed to 119.4 kg. A polymer was thus obtained.

As a result of checking the composition of the resultant polymer (1-8), the respective structural units derived from MMA, phMI, and chMI monomers were 63.3 mass %, 15.8 mass %, and 20.9 mass %. The weight-average molecular weight of the resultant polymer was 127,000, and the resultant polymer contained 910 mass ppm of m-xylene.

[Production Example 2-1]: Production of Methacrylic Resin Having Lactone Ring Structural Unit In this case, 40 parts by mass of methyl methacrylate, 10 parts by mass of 2-(hydroxymethyl)methyl acrylate, 50 parts by mass of toluene, and 0.025 parts by mass of tris(2,4-di-t-butylphenyl)phosphite (A-1) as an organic phosphorous compound were introduced into an autoclave that had been purged with nitrogen in advance, including a stirring device, a temperature sensor, a cooling pipe, and a nitrogen gas introduction pipe.

After this, while introducing nitrogen gas, the temperature was increased to 100° C. While adding 0.05 parts by mass of t-amyl peroxyisononanoate as a polymerization initiator, a toluene solution containing 0.1 parts by mass of t-amyl peroxyisononanoate was dropped for 2 hours, and solution polymerization was performed at about 105° C. to 110° C. under reflux. Further, polymerization was continued for 4 hours.

Next, 0.05 parts by mass a stearyl phosphate/distearyl phosphate mixture (A-2) as an organic phosphorous compound was added as a cyclization catalyst to the resultant polymer solution Cyclization condensation reaction was performed at about 90° C. to 102° C. for 2 hours, under reflux.

The resultant polymer solution was then heated to 240° C. by a heater composed of a multitubular heat exchanger, and introduced into a twin screw extruder having a plurality of vent ports for devolatilization and a plurality of side feed ports downstream. In this way, cyclization reaction was made to proceed while performing devolatilization.

In the twin screw extruder, the resultant copolymer solution was fed at 15 kg/hr in terms of resin, and the following conditions were used: barrel temperature: 250° C., rotational speed: 100 rpm, and degree of vacuum: 10 Torr to 300 Torr. Here, an antioxidant (made by BASF, Irganox 1010), a catalyst quencher (zinc octyl), and AS resin (acrylonitrile-styrene resin) (made by Asahi Kasei Chemicals Corporation, STYLAC AS783) were charged through two side feeds provided in the latter half portion of the twin screw extruder. The AS resin was added at a feed speed of 1.65 kg/hr.

The resin composition melt-kneaded in the twin screw extruder was extruded from the strand die, cooled by water, and then pelletized to obtain a resin composition (2-1).

As a result of checking the composition of the resultant resin composition, the content of the lactone ring structural unit was 28.3 mass %. The content of the lactone ring structural unit was measured according to the method described in JP 2007-297620 A. In Production Example 2-1, the composition in a resin state was not checked. The weight-average molecular weight of the resultant resin composition was 129,000, and the resultant resin composition (2-1) contained 510 mass ppm of toluene and 250 mass ppm of methanol.

Production Example 2-2

Using the polymerization solution obtained in Production Example 2-1, drying under reduced pressure was performed under the conditions of 150° C., 10 Torr, and 6 hours, and volatile matter such as the polymerization solvent was removed. The resultant resin composition in a solid state was ground, and further dried under reduced pressure under the conditions of 80° C., 10 Torr, and 3 hours.

As a result of checking the composition of the resultant resin composition, the content of the lactone ring structural unit was 31.5 mass %. The weight-average molecular weight of the resultant resin composition was 121,000, and the resultant resin composition (2-2) contained 4360 mass ppm of toluene and 720 mass ppm of methanol.

[Production Example 3-1]: Production of Methacrylic Resin Having Glutarimide-Based Structural Unit Using a methyl methacrylate-styrene copolymer (MS resin) as raw material resin and monomethylamine as an imidizing agent, methacrylic resin having a glutarimide-based structural unit was produced by a meshing same direction rotary type twin screw extruder having a diameter of 15 mm and L/D=90.

Here, by flowing nitrogen gas from a hopper, the oxygen concentration in the extruder was set to 1% or less. The set temperature of each temperature control zone in the extruder was 250° C., the screw rotational speed was 300 rpm, the feed rate of MS resin was 1 kg/hr, and the feed rate of monomethylamine was 20 parts by mass relative to 100 parts by mass of MS resin.

MS resin was charged from a hopper, and caused to melt and fill the extruder by a kneading block. After this, monomethylamine was charged from a nozzle. The filling of the resin was performed with a seal ring inserted at the end of the reaction zone. By products and excessive methylamine after the reaction were removed by reducing the degree of vacuum of the vent port to 60 Torr. Resin produced as a strand from a die provided at the extruder exit was cooled in a water tank, and then pelletized by a pelletizer.

Next, the resultant pellet was charged from a hopper at a feed rate of 1 kg/hr in a meshing same direction rotary type twin screw extruder with a diameter of 15 mm and L/D=90, under the following conditions: the set temperature of each temperature control zone in the extruder: 230° C., and screw rotational speed: 150 rpm. The resin was caused to melt and fill the extruder by a kneading block. After this, 0.8 parts by mass of dimethyl carbonate relative to 100 parts by mass of the pellet-shaped resin was charged from a nozzle, to reduce the carboxyl group in the resin. The filling of the resin was performed with a reverse flight inserted at the end of the reaction zone. By products and excessive dimethyl carbonate after the reaction were removed by reducing the degree of vacuum of the vent port to 100 Torr.

Resin produced as a strand from a die provided at the extruder exit was cooled in a water tank, and then pelletized again by a pelletizer, to obtain methacrylic resin (3-1) having a glutarimide-based structural unit.

As a result of measuring the content of the glutarimide-based structural unit of the resultant resin (3-1) according to WO 2012/114718 A1, the content of the glutarimide-based structural unit was 58 mass %, and the content of the styrene monomer-derived structural unit was 19 mass %. The weight-average molecular weight of the resultant resin was 109,000, and the resultant resin pellet contained 750 mass ppm of methanol.

Production Example 3-2

The methacrylic resin having the glutarimide-based structural unit obtained in Production Example 3-1 was dissolved using toluene so that the resin concentration was 30 mass %. The resulting resin solution was filtered by a stainless-steel cartridge type filter with a filter precision of 1 μm. The resin solution after the filtering was devolatilized using the concentrating device and the thin-film evaporator used in Production Example 1-1. Devolatilization was performed according to Production Example 1-1, except that the operation conditions in the thin-film evaporator were changed to an in-device temperature of 270° C. and a degree of vacuum of 200 Torr. The resultant resin (3-2) contained 1700 mass ppm of toluene, and 370 mass ppm of methanol.

Production Example 3-3

Methacrylic resin (3-3) having a glutarimide-based structural unit was obtained in the same way as Production Example 3-1, except that the feed speed of MS resin was changed to 0.5 kg/hr and the feed rate of monomethylamine was changed to 40 parts by mass relative to 100 parts by mass of the MS resin.

As a result of measuring the content of the glutarimide-based structural unit of the resultant resin (3-3) according to WO 2012/114718 A1, the content of the glutarimide-based structural unit was 72 mass %, and the content of the styrene monomer-derived structural unit was 19 mass %. The weight-average molecular weight of the resultant resin was 98,000, and the resultant resin pellet contained 560 mass ppm of methanol.

Production Example 4

A resin composition (4) was obtained in the same way as Production Example 1-1, except that 0.10 kg of tris(2,4-di-t-butylphenyl)phosphite was added in addition to the monomers, the chain transfer agent, and the polymerization initiator in polymerization.

As a result of checking the composition of the resultant resin composition (4), the respective structural units derived from MMA, phMI, and chMI monomers were 81.3 mass %, 7.9 mass %, and 10.8 mass %. In Production Example 4, the composition in a resin state was not checked.

The details of the resin composition (4) are listed in Table 1.

Example 1

(Preparation of Methacrylic Resin Composition)

The methacrylic resin (1-1) obtained in Production Example 1-1 was vacuum dried at 90° C. for 5 hours, cooled to 30° C. in a nitrogen atmosphere, and used to prepare a composition.

As an organic phosphorous compound, bis(2,6-di-t-butyl-4-methylphenyl)pentaerythritoldiphosphite (A-3) dried under reduced pressure prior to use was used.

A mixture of 100 parts by mass of the methacrylic resin (1-1) and 0.1 parts by mass of the organic phosphorous compound was prepared using a tumbler mixer that had been purged with nitrogen in advance.

The resultant mixture was fed into and melt-kneaded by a 58 mm φ vented twin-screw extruder with use of dehumidified air adjusted to a dew point of −30° C. and a temperature of 80° C. A nitrogen supply line was provided in a lower part of a raw material hopper for the twin-screw extruder, and nitrogen was introduced into the extruder during the above operation. The oxygen concentration at the bottom of the raw material hopper was measured to be approximately 1 volume %.

Operation was performed under conditions of a temperature setting for a lower part of the extruder and a die of 270° C., a rotational speed of 200 rpm, a degree of vacuum in a vent part of 200 Torr, and a discharge rate of 120 kg/hr.

The melt-kneaded resin composition was extruded through a porous die as strands and was introduced into a cooling bath filled with cooling water that had been preheated to 50° C. The resin composition was cooled and solidified, and was cut using a cutter to obtain a pelletized composition.

The measured temperature of the molten resin composition at the porous die exit was 280° C., and the time of arrival at the cooling water surface from the porous die exit was about 2 sec.

The resultant composition contained 96 mass ppm of phosphorus element and 660 mass ppm of m-xylene. The ratio (P3/P5) of the integral value (P3) of the spectral peak assigned to trivalent phosphorus to the integral value (P5) of the spectral peak assigned to pentavalent phosphorus, calculated by $^{31}$P-NMR, was 1.1. The weight-average molecular weight was 142,000, the glass transition temperature was 135° C., and the photoelastic coefficient was $0.2 \times 10^{-12}$ Pa$^{-1}$.

Film formation evaluation was performed using the resultant composition. The results are listed in Table 1.

Example 2

A composition was prepared in the same way as in Example 1, except that the amount of the organic phosphorous compound (A-3) was changed to 0.3 parts by mass.

The resultant composition contained 270 mass ppm of phosphorus element and 590 mass ppm of m-xylene, and the ratio (P3/P5) calculated by $^{31}$P-NMR was 1.8. The weight-average molecular weight was 142,000, the glass transition temperature was 135° C., and the photoelastic coefficient was $0.2 \times 10^{-12}$ Pa$^{-1}$.

Film formation evaluation was performed using the resultant composition, as in Example 1. The results are listed in Table 1.

Example 3

A composition was prepared in the same way as in Example 1, except that the amount of the organic phosphorous compound (A-3) was changed to 0.8 parts by mass.

The resultant composition contained 720 mass ppm of phosphorus element and 340 mass ppm of m-xylene, and the ratio (P3/P5) calculated by $^{31}$P-NMR was 2.8. The weight-average molecular weight was 142,000, the glass transition temperature was 135° C., and the photoelastic coefficient was $0.2\times10^{-12}$ $Pa^{-1}$.

Film formation evaluation was performed using the resultant composition, as in Example 1. The results are listed in Table 1.

Example 4

A composition was prepared in the same way as in Example 2, except that tetrakis(2,4-di-t-butyl-5methylphenyl)4,4'biphenylenediphosphonite (A-6) was used instead of bis(2,6-di-t-butyl-4-methylphenyl)pentaerythritoldiphosphite (A-3) as the organic phosphorous compound.

The resultant composition contained 140 mass ppm of phosphorus element and 510 mass ppm of m-xylene, and the ratio (P3/P5) calculated by $^{31}$P-NMR was 4.8. The weight-average molecular weight was 142,000, the glass transition temperature was 135° C., and the photoelastic coefficient was $0.2\times10^{-12}$ $Pa^{-1}$.

Film formation evaluation was performed using the resultant composition, as in Example 1. The results are listed in Table 1.

Example 5

A composition was prepared in the same way as in Example 1, except that the polymer composition obtained in Production Example 2-1 was used instead of the polymer obtained in Production Example 1-1 and the amount of the organic phosphorous compound (A-3) was changed to 0.2 parts by mass.

The resultant composition contained 215 mass ppm of phosphorus element, 310 mass ppm of toluene, and 210 mass ppm of methanol, and the ratio (P3/P5) calculated by $^{31}$P-NMR was 1.1. The weight-average molecular weight was 122,000, the glass transition temperature was 124° C., and the photoelastic coefficient was $1.5\times10^{-12}$ $Pa^{-1}$.

Film formation evaluation was performed using the resultant composition, as in Example 1. The results are listed in Table 1.

Example 6

A composition was prepared in the same way as in Example 1, except that the polymer obtained in Production Example 3-1 was used instead of the polymer obtained in Production Example 1-1 and the amount of the organic phosphorous compound (A-3) was changed to 0.2 parts by mass.

The resultant composition contained 190 mass ppm of phosphorus element and 190 mass ppm of methanol, and the ratio (P3/P5) calculated by $^{31}$P-NMR was 1.2. The weight-average molecular weight was 112,000, the glass transition temperature was 140° C., and the photoelastic coefficient was $3\times10^{-12}$ $Pa^{-1}$.

Film formation evaluation was performed using the resultant composition, as in Example 1. The results are listed in Table 1.

Example 7

A composition was prepared in the same way as in Example 1, except that (6-[3-(3-t-butyl-4-hydroxy-5-methylphenyl)propoxy]-2,4,8,10-tetra-t-butyldibenz[d,f][1,3,2]dioxaphosphepin (A-4) was used instead of bis(2,6-di-t-butyl-4-methylphenyl)pentaerythritoldiphosphite (A-3) as the organic phosphorous compound.

The resultant composition contained 46 mass ppm of phosphorus element and 600 mass ppm of m-xylene, and the ratio (P3/P5) calculated by $^{31}$P-NMR was 0.8. The weight-average molecular weight was 142,000, the glass transition temperature was 135° C., and the photoelastic coefficient was $0.2\times10^{-12}$ $Pa^{-1}$.

Film formation evaluation was performed using the resultant composition, as in Example 1. The results are listed in Table 1.

Example 8

A composition was prepared in the same way as in Example 1, except that 2,2'-methylenebis(4,6-di-tert-butylphenyl)octylphosphite (A-5) was used instead of bis(2,6-di-t-butyl-4-methylphenyl)pentaerythritoldiphosphite (A-3) as the organic phosphorous compound.

The resultant composition contained 49 mass ppm of phosphorus element and 570 mass ppm of m-xylene, and the ratio (P3/P5) calculated by $^{31}$P-NMR was 0.9. The weight-average molecular weight was 142,000, the glass transition temperature was 135° C., and the photoelastic coefficient was $0.2\times10^{-12}$ $Pa^{-1}$.

Film formation evaluation was performed using the resultant composition, as in Example 1. The results are listed in Table 1.

Example 9

A composition was prepared in the same way as in Example 1, except that the polymer obtained in Production Example 1-2 was used instead of the polymer obtained in Production Example 1-1, tetrakis(2,4-di-t-butyl-5methylphenyl)4,4'biphenylenediphosphonite (A-6) was used instead of bis(2,6-di-t-butyl-4-methylphenyl)pentaerythritoldiphosphite (A-3) as the organic phosphorous compound, and its compounding amount was changed to 0.02 parts by mass. Here, since the amount of the organic phosphorous compound handled was small, the organic phosphorous compound was dissolved in toluene beforehand, the toluene solution was sprayed to the polymer obtained in Production Example 1-2, and the mixture was prepared using a tumbler mixer. The mixture was then dried under reduced pressure, and fed into the extruder.

The resultant composition contained 10 mass ppm of phosphorus element and 480 mass ppm of m-xylene, and the ratio (P3/P5) calculated by $^{31}$P-NMR was 2.8. The weight-average molecular weight was 108,000, the glass transition temperature was 121° C., and the photoelastic coefficient was $0.2\times10^{-12}$ $Pa^{-1}$.

Film formation evaluation was performed using the resultant composition, as in Example 1. The results are listed in Table 1.

Example 10

A composition was prepared in the same way as in Example 1, except that the polymer obtained in Production Example 1-7 was used instead of the polymer obtained in Production Example 1-1 and the amount of the organic phosphorous compound (A-3) was changed to 0.2 parts by mass.

The resultant composition contained 195 mass ppm of phosphorus element and 650 mass ppm of m-xylene, and the ratio (P3/P5) calculated by $^{31}$P-NMR was 2.7. The weight-average molecular weight was 168,000, the glass transition temperature was 128° C., and the photoelastic coefficient was $0.9 \times 10^{-12}$ $Pa^{-1}$.

Film formation evaluation was performed using the resultant composition, as in Example 1. The results are listed in Table 1.

Example 11

A composition was prepared in the same way as in Example 1, except that the polymer obtained in Production Example 1-8 was used instead of the polymer obtained in Production Example 1-1 and the amount of the organic phosphorous compound (A-3) was changed to 0.3 parts by mass.

The resultant composition contained 283 mass ppm of phosphorus element and 610 mass ppm of m-xylene, and the ratio (P3/P5) calculated by $^{31}$P-NMR was 1.2. The weight-average molecular weight was 112,000, the glass transition temperature was 157° C., and the photoelastic coefficient was $0.5 \times 10^{-12}$ $Pa^{-1}$.

Film formation evaluation was performed using the resultant composition, as in Example 1. The results are listed in Table 1.

Example 12

A composition was prepared in the same way as in Example 1, except that the polymer obtained in Production Example 1-4 was used instead of the polymer obtained in Production Example 1-1.

The resultant composition contained 98 mass ppm of phosphorus element and 260 mass ppm of m-xylene, and the ratio (P3/P5) calculated by $^{31}$P-NMR was 1.3. The weight-average molecular weight was 86,000, the glass transition temperature was 135° C., and the photoelastic coefficient was $0.2 \times 10^{-12}$ $Pa^{-1}$.

Film formation evaluation was performed using the resultant composition, as in Example 1. The results are listed in Table 1.

Example 13

A composition was prepared in the same way as in Example 1, except that the polymer obtained in Production Example 1-3 was used instead of the polymer obtained in Production Example 1-1.

The resultant composition contained 96 mass ppm of phosphorus element and 900 mass ppm of m-xylene, and the ratio (P3/P5) calculated by $^{31}$P-NMR was 0.2. The weight-average molecular weight was 216,000, the glass transition temperature was 135° C., and the photoelastic coefficient was $0.2 \times 10^{-12}$ $Pa^{-1}$.

Film formation evaluation was performed using the resultant composition, as in Example 1. The results are listed in Table 1.

Example 14

A composition was prepared in the same way as in Example 1, except that the polymer obtained in Production Example 1-5 was used instead of the polymer obtained in Production Example 1-1.

The resultant composition contained 96 mass ppm of phosphorus element and 1720 mass ppm of m-xylene, and the ratio (P3/P5) calculated by $^{31}$P-NMR was 0.5. The weight-average molecular weight was 146,000, the glass transition temperature was 135° C., and the photoelastic coefficient was $0.2 \times 10^{-12}$ $Pa^{-1}$.

Film formation evaluation was performed using the resultant composition, as in Example 1. The results are listed in Table 1.

Example 15

A composition was prepared in the same way as in Example 1, except that the polymer obtained in Production Example 1-6 was used instead of the polymer obtained in Production Example 1-1.

The resultant composition contained 95 mass ppm of phosphorus element and 2870 mass ppm of m-xylene, and the ratio (P3/P5) calculated by $^{31}$P-NMR was 0.3. The weight-average molecular weight was 146,000, the glass transition temperature was 135° C., and the photoelastic coefficient was $0.2 \times 10^{-12}$ $Pa^{-1}$.

Film formation evaluation was performed using the resultant composition, as in Example 1. The results are listed in Table 1.

Example 16

A composition was prepared in the same way as in Example 1, except that the polymer obtained in Production Example 2-2 was used instead of the polymer obtained in Production Example 1-1.

The resultant composition contained 120 mass ppm of phosphorus element, 1230 mass ppm of toluene, and 650 mass ppm of methanol, and the ratio (P3/P5) calculated by $^{31}$P-NMR was 0.4. The weight-average molecular weight was 121,000, the glass transition temperature was 129° C., and the photoelastic coefficient was $2.2 \times 10^{-12}$ $Pa^{-1}$.

Film formation evaluation was performed using the resultant composition, as in Example 1. The results are listed in Table 1.

Example 17

A composition was prepared in the same way as in Example 1, except that the polymer obtained in Production Example 3-2 was used instead of the polymer obtained in Production Example 1-1.

The resultant composition contained 95 mass ppm of phosphorus element, 1150 mass ppm of toluene, and 310 mass ppm of methanol, and the ratio (P3/P5) calculated by $^{31}$P-NMR was 0.3. The weight-average molecular weight was 112,000, the glass transition temperature was 140° C., and the photoelastic coefficient was $3 \times 10^{-12}$ $Pa^{-1}$.

Film formation evaluation was performed using the resultant composition, as in Example 1. The results are listed in Table 1.

Example 18

A composition was prepared in the same way as in Example 1, except that 0.05 parts by mass of pentaerythrityltetrakis(3-laurylthiopropionate) (antioxidant) was further added.

The resultant composition contained 96 mass ppm of phosphorus element and 470 mass ppm of m-xylene, and the ratio (P3/P5) calculated by $^{31}$P-NMR was 3.6. The weight-average molecular weight was 142,000, the glass transition temperature was 135° C., and the photoelastic coefficient was $0.2 \times 10^{-12}$ $Pa^{-1}$.

Film formation evaluation was performed using the resultant composition, as in Example 1. The results are listed in Table 1.

Comparative Example 1

A composition was prepared in the same way as in Example 1, except that a composition prepared by mixing and melt-kneading 90 parts by mass of the polymer obtained in Production Example 1-1 and 10 parts by mass of the composition obtained in Example 1 was used.

The resultant composition contained 8 mass ppm of phosphorus element and 610 mass ppm of m-xylene, and the ratio (P3/P5) calculated by $^{31}$P-NMR was 0.1. The weight-average molecular weight was 142,000, the glass transition temperature was 135° C., and the photoelastic coefficient was $0.2\times10^{-12}$ $Pa^{-1}$.

Film formation evaluation was performed using the resultant composition, as in Example 1. The results are listed in Table 1.

As can be understood from this, in the evaluation under larger-scale and harsher film formation conditions, there was significant degradation as compared with Example 1, while there was no significant difference from the results in Example 1 in the conventional evaluation using a small film formation device.

Comparative Example 2

A composition was prepared in the same way as in Example 1, except that the polymer composition containing the organic phosphorous compound obtained in Production Example 4 was used instead of the polymer obtained in Production Example 1-1.

The resultant composition contained 9 mass ppm of phosphorus element and 730 mass ppm of m-xylene, and the ratio (P3/P5) calculated by $^{31}$P-NMR was 0.1. The weight-average molecular weight was 14,5000, the glass transition temperature was 135° C., and the photoelastic coefficient was $0.2\times10^{-12}$ $Pa^{-1}$.

Using the polymer directly without newly adding an organic phosphorous compound, film formation evaluation was performed as in Example 1. The results are listed in Table 1.

As can be understood from this, in the evaluation under larger-scale and harsher film formation conditions, there was significant degradation as compared with Example 1, while there was no significant difference from the results in Example 1 in the conventional evaluation using a small film formation device.

Comparative Example 3

A composition was prepared in the same way as in Example 1, except that the amount of the organic phosphorous compound was changed to 2.0 parts by mass.

The resultant composition contained 1870 mass ppm of phosphorus element and 830 mass ppm of m-xylene, and the ratio (P3/P5) calculated by $^{31}$P-NMR was 8.7. The weight-average molecular weight was 152,000, the glass transition temperature was 135° C., and the photoelastic coefficient was $0.2\times10^{-12}$ $Pa^{-1}$.

Film formation evaluation was performed using the resultant composition, as in Example 1. The results are listed in Table 1.

Comparative Example 4

A composition was prepared in the same way as in Example 1, except that bisphenol A bis(diphenylphosphate) (A-7) was used instead of bis(2,6-di-t-butyl-4-methylphenyl)pentaerythritol diphosphate (A-3) as the organic phosphorous compound.

The resultant composition contained 62 mass ppm of phosphorus element and 510 mass ppm of m-xylene, and no spectrum assigned to trivalent phosphorus was observed in $^{31}$P-NMR. The weight-average molecular weight was 142,000, the glass transition temperature was 135° C., and the photoelastic coefficient was $0.2\times10^{-12}$ $Pa^{-1}$.

Film formation evaluation was performed using the resultant composition, as in Example 1. The results are listed in Table 1.

Comparative Example 5

A composition was prepared in the same way as in Example 1, except that the polymer obtained in Production Example 3-3 was used instead of the polymer obtained in Production Example 1-1.

The resultant composition contained 97 mass ppm of phosphorus element and 270 mass ppm of methanol, and the ratio (P3/P5) calculated by $^{31}$P-NMR was 0.1. The weight-average molecular weight was 96,000, the glass transition temperature was 166° C., and the photoelastic coefficient was $3\times10^{-12}$ $Pa^{-1}$.

Film formation evaluation was performed using the resultant composition, as in Example 1. The results are listed in Table 1.

Comparative Example 6

The methacrylic resin (1-1) obtained in Production Example 1-1 was vacuum dried at 90° C. for 5 hours, cooled to 30° C. in the air, and used to prepare a composition.

As an organic phosphorous compound, bis(2,6-di-t-butyl-4-methylphenyl)pentaerythritoldiphosphite (A-3) dried under reduced pressure prior to use was used.

A mixture of 100 parts by mass of the methacrylic resin (1-1) and 0.1 parts by mass of the organic phosphorous compound was prepared beforehand using a tumbler mixer.

The resultant mixture was fed into a 58 mmϕ vent-equipped twin screw extruder and melt-kneaded. Here, the operation was performed without flow of nitrogen into the lower portion of the extruder.

The operation conditions were as follows: extruder lower portion and die set temperature: 270° C., rotational speed: 200 rpm, degree of vacuum in the vent part: 200 Torr, and discharge rate: 120 kg/hr.

The melt-kneaded resin composition was extruded in strand form through the porous die, introduced into a cooling bath filled with cooling water heated to 50° C. beforehand to be cooled and solidified, and cut using a cutter to obtain a pelletized composition.

The measured temperature of the molten resin composition at the porous die exit was 280° C., and the time of arrival at the cooling water surface from the porous die exit was about 10 sec.

The resultant composition contained 96 mass ppm of phosphorus element and 520 mass ppm of m-xylene, and the ratio (P3/P5) calculated by $^{31}$P-NMR was 0.1. The weight-average molecular weight was 142,000, the glass transition temperature was 135° C., and the photoelastic coefficient was $0.2\times10^{-12}$ $Pa^{-1}$.

Film formation evaluation was performed using the resultant composition, as in Example 1. The results are listed in Table 1.

| | Raw material used | | | | | Properties of resin composition | | | | | | | Film formation evaluation (method A) | | | Film formation evaluation (method B) | | |
|---|---|---|---|---|---|---|---|---|---|---|---|---|---|---|---|---|---|---|
| | Resin | | Organic phosphorous compound | | | 2 Molecular weight (Mw) | 3 Tg °C | 4 Content of phosphorous element mass ppm | 5 P3/P5 | 6 Photoelastic coefficient $10^{-12}$ Pa$^{-1}$ | 7 Residual solvent amount mass ppm | Residual alcohol amount mass ppm | 9 Solution transmittance % | 10-i Roll stain | 10-ii Film appearance | 9 Solution transmittance % | 10-i Roll stain | 10-ii Film appearance |
| | Type | parts by mass | Type | parts by mass | | | | | | | | | | | | | | |
| Example 1 | Production Example 1-1 | 100 | A-3 | 0.1 | 142000 | 135 | 96 | 1.1 | 0.2 | 660 | — | 99.8 | Excellent | Excellent | 98.2 | Excellent | Excellent |
| Example 2 | Production Example 1-1 | 100 | A-3 | 0.3 | 142000 | 135 | 270 | 1.8 | 0.2 | 590 | — | 99.1 | Excellent | Excellent | 98.8 | Excellent | Excellent |
| Example 3 | Production Example 1-1 | 100 | A-3 | 0.8 | 142000 | 135 | 720 | 2.8 | 0.2 | 340 | — | 99.7 | Excellent | Excellent | 98.5 | Excellent | Excellent |
| Example 4 | Production Example 1-1 | 100 | A-6 | 0.3 | 142000 | 135 | 140 | 4.8 | 0.2 | 510 | — | 99.8 | Excellent | Excellent | 99.0 | Excellent | Excellent |
| Example 5 | Production Example 2-1* | 100 | A-1 + A-2 + A-3 | 0.24 | 122000 | 124 | 215 | 1.1 | 1.5 | 310 | 210 | 98.5 | Excellent | Excellent | 98.9 | Excellent | Excellent |
| Example 6 | Production Example 3-1 | 100 | A-3 | 0.2 | 112000 | 140 | 190 | 1.2 | 3 | — | 190 | 99.7 | Excellent | Excellent | 98.1 | Excellent | Excellent |
| Example 7 | Production Example 1-1 | 100 | A-4 | 0.1 | 142000 | 135 | 46 | 0.8 | 0.2 | 600 | — | 98.9 | Excellent | Excellent | 98.3 | Excellent | Excellent |
| Example 8 | Production Example 1-1 | 100 | A-5 | 0.1 | 142000 | 135 | 49 | 0.9 | 0.2 | 570 | — | 98.7 | Excellent | Excellent | 98.4 | Excellent | Excellent |
| Example 9 | Production Example 1-2 | 100 | A-6 | 0.02 | 108000 | 121 | 10 | 2.8 | 0.9 | 480 | — | 98.3 | Excellent | Excellent | 98.9 | Excellent | Excellent |
| Example 10 | Production Example 1-7 | 100 | A-3 | 0.2 | 168000 | 128 | 195 | 2.7 | 0.5 | 650 | — | 98.0 | Excellent | Excellent | 98.2 | Excellent | Excellent |
| Example 11 | Production Example 1-8 | 100 | A-3 | 0.3 | 112000 | 157 | 283 | 1.2 | 0.2 | 610 | — | 99.7 | Excellent | Excellent | 98.2 | Excellent | Excellent |
| Example 12 | Production Example 1-4 | 100 | A-3 | 0.1 | 86000 | 135 | 98 | 1.3 | 0.2 | 260 | — | 99.7 | Excellent | Winding failure | 98.7 | Winding failure | Winding failure |
| Example 13 | Production Example 1-3 | 100 | A-3 | 0.1 | 216000 | 135 | 96 | 0.2 | 0.2 | 900 | — | 98.7 | Excellent | Excellent | 94.7 | Good | Good |
| Example 14 | Production Example 1-5 | 100 | A-3 | 0.1 | 146000 | 135 | 96 | 0.5 | 0.2 | 1720 | — | 98.9 | Excellent | Excellent | 94.3 | Good | Excellent |
| Example 15 | Production Example 1-6 | 100 | A-3 | 0.1 | 146000 | 135 | 95 | 0.3 | 0.2 | 2870 | — | 98.7 | Excellent | Excellent | 95.7 | Good | Excellent |
| Example 16 | Production Example 2-2* | 100 | A-1 + A-2 + A-3 | 0.14 | 121000 | 129 | 120 | 0.4 | 2.2 | 1230 | 650 | 99.2 | Excellent | Excellent | 95.9 | Excellent | Good |
| Example 17 | Production Example 3-2 | 100 | A-3 | 0.1 | 112000 | 140 | 95 | 0.3 | 3 | 1150 | 310 | 98.1 | Excellent | Excellent | 94.7 | Good | Good |
| Example 18 | Production Example 1-1 | 100 | A-3 | 0.1 | 142000 | 135 | 96 | 3.6 | 0.2 | 470 | — | 99.3 | Excellent | Excellent | 98.7 | Excellent | Excellent |
| Comparative Example 1* | Production Example 1-1 | 90 | A-3 | 0.01 | 142000 | 135 | 8 | 0.1 | 0.2 | 610 | — | 95.8 | Excellent | Excellent | 95.8 | Excellent | Good |
| Comparative Example 2 | Production Example 4* | 100 | A-1 | 0.02 | 145000 | 135 | 9 | 0.1 | 0.2 | 730 | — | 98.6 | Excellent | Excellent | 76.5 | Good | Good |
| Comparative Example 3 | Production Example 1-1 | 100 | A-3 | 2.0 | 152000 | 135 | 1870 | 8.7 | 0.2 | 830 | — | 97.8 | Good | Good | 79.2 | Poor | Poor |
| Comparative Example 4 | Production Example 1-1 | 100 | A-7 | 0.1 | 142000 | 135 | 62 | 0 | 0.2 | 510 | — | 96.5 | Excellent | Excellent | 72.6 | Good | Good |
| Comparative Example 5 | Production Example 3-3 | 100 | A-3 | 0.1 | 96000 | 166 | 97 | 0.1 | 3 | — | 270 | 95.6 | Good | Good | 71.3 | Poor | Poor |
| Comparative Example 6 | Production Example 1-1 | 100 | A-3 | 0.1 | 142000 | 135 | 96 | 0.1 | 0.2 | 520 | — | 98.3 | Excellent | Excellent | 82.3 | Good | Poor |

*Resin composition

INDUSTRIAL APPLICABILITY

The methacrylic resin composition according to this disclosure has high heat resistance, excellent birefringence, and excellent heat stability and molding processability.

The methacrylic resin composition according to the present embodiment is suitable for use as an optical material in, for example: polarizing plate protective films used in, for example, displays such as liquid-crystal displays, plasma displays, organic EL displays, field emission displays, and rear projection televisions; retardation plates (for example, quarter-wave plates and half-wave plates); liquid-crystal optical compensation films (for example, viewing angle control films); display front plates; display base plates; lenses; transparent conductive base plates (for example, transparent base plates and touch panels of solar cells); waveguides, lenses, lens arrays, optical fibers, and optical fiber coating materials used in the fields of optical communication systems, optical switching systems, and optical measurement systems; LED lenses; and lens covers.

The invention claimed is:

1. A methacrylic resin composition comprising:
a methacrylic resin including a structural unit (X) having a cyclic structure-containing main chain, the structural unit (X) being at least one type selected from the group consisting of an N-substituted maleimide monomer-derived structural unit, a glutarimide-based structural unit, and a lactone ring structural unit; and
an organic phosphorous compound,
wherein the methacrylic resin has a glass transition temperature from more than 120° C. to 160° C.,
a content of phosphorus element in the composition is 10 mass ppm to 1000 mass ppm, and
a ratio P3/P5 of an integral value P3 of a spectral peak assigned to trivalent phosphorus to an integral value P5 of a spectral peak assigned to pentavalent phosphorus in $^{31}$P-NMR measurement is 0.2 to 5.0.

2. The methacrylic resin composition according to claim 1, having a residual solvent amount of less than 1000 mass ppm.

3. The methacrylic resin composition according to claim 1, having a residual alcohol amount of less than 500 mass ppm.

4. The methacrylic resin composition according to claim 1, wherein the methacrylic resin has a weight-average molecular weight Mw of 90,000 to 200,000 as measured by gel permeation chromatography (GPC) as a polymethyl methacrylate-converted value.

5. The methacrylic resin composition according to claim 1, wherein
the structural unit (X) includes the glutarimide-based structural unit, and
the glutarimide-based structural unit has a content of 5 mass % to 70 mass % relative to 100 mass % of the methacrylic resin.

6. The methacrylic resin composition according to claim 1, wherein
the structural unit (X) includes an N-substituted maleimide monomer-derived structural unit, and
the N-substituted maleimide monomer-derived structural unit has a content of 5 mass % to 40 mass % relative to 100 mass % of the methacrylic resin.

7. The methacrylic resin composition according to claim 1, wherein
the structural unit (X) includes a lactone ring structural unit, and
the lactone ring structural unit has a content of 5 mass % to 40 mass % relative to 100 mass % of the methacrylic resin.

8. The methacrylic resin composition according to claim 1, having a photoelastic coefficient with an absolute value of $3.0 \times 10^{-12}$ Pa$^{-1}$ or less.

9. The methacrylic resin composition according to claim 8, having a photoelastic coefficient with an absolute value of $1.0 \times 10^{-12}$ Pa$^{-1}$ or less.

10. The methacrylic resin composition according to claim 2, having a residual alcohol amount of less than 500 mass ppm.

11. The methacrylic resin composition according to claim 2, wherein the methacrylic resin has a weight-average molecular weight Mw of 90,000 to 200,000 as measured by gel permeation chromatography (GPC) as a polymethyl methacrylate-converted value.

12. The methacrylic resin composition according to claim 3, wherein the methacrylic resin has a weight-average molecular weight Mw of 90,000 to 200,000 as measured by gel permeation chromatography (GPC) as a polymethyl methacrylate-converted value.

13. The methacrylic resin composition according to claim 2, wherein
the structural unit (X) includes the glutarimide-based structural unit, and
the glutarimide-based structural unit has a content of 5 mass % to 70 mass % relative to 100 mass % of the methacrylic resin.

14. The methacrylic resin composition according to claim 2, wherein
the structural unit (X) includes an N-substituted maleimide monomer-derived structural unit, and
the N-substituted maleimide monomer-derived structural unit has a content of 5 mass % to 40 mass % relative to 100 mass % of the methacrylic resin.

15. The methacrylic resin composition according to claim 2, wherein
the structural unit (X) includes a lactone ring structural unit, and
the lactone ring structural unit has a content of 5 mass % to 40 mass % relative to 100 mass % of the methacrylic resin.

* * * * *